(12) United States Patent
Harmon et al.

(10) Patent No.: US 10,291,409 B2
(45) Date of Patent: May 14, 2019

(54) STORING, MIGRATING, AND CONTROLLING ACCESS TO ELECTRONIC DOCUMENTS DURING ELECTRONIC DOCUMENT SIGNING PROCESSES

(71) Applicant: ADOBE INC., San Jose, CA (US)

(72) Inventors: Dale Dean Harmon, Billerica, MA (US); Benjamin Follis, London (GB); Joaquin Lull, Hollis, NH (US); David Jedlinsky, Boston, MA (US)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 15/438,338

(22) Filed: Feb. 21, 2017

(65) Prior Publication Data

US 2018/0241569 A1  Aug. 23, 2018

(51) Int. Cl.
| | |
|---|---|
| *H04L 9/32* | (2006.01) |
| *G06F 21/64* | (2013.01) |
| *H04L 29/06* | (2006.01) |
| *H04L 29/08* | (2006.01) |
| *H04L 29/12* | (2006.01) |

(52) U.S. Cl.
CPC ............ *H04L 9/3247* (2013.01); *G06F 21/64* (2013.01); *H04L 63/107* (2013.01); *H04L 67/18* (2013.01); *G06F 2221/2111* (2013.01); *H04L 61/1511* (2013.01); *H04L 61/609* (2013.01)

(58) Field of Classification Search
None
See application file for complete search history.

(56) References Cited

U.S. PATENT DOCUMENTS

| | | | | |
|---|---|---|---|---|
| 9,450,958 | B1* | 9/2016 | Saylor | G06F 21/45 |
| 2012/0331088 | A1* | 12/2012 | O'Hare | G06F 21/6227 709/214 |
| 2013/0086662 | A1* | 4/2013 | Roth | G06F 21/31 726/7 |
| 2015/0213568 | A1* | 7/2015 | Follis | G06Q 50/18 705/311 |
| 2015/0242382 | A1* | 8/2015 | Pravetz | G06F 17/212 715/268 |

\* cited by examiner

*Primary Examiner* — Brian Whipple
(74) *Attorney, Agent, or Firm* — Brake Hughes Bellermann LLP

(57) ABSTRACT

Systems and techniques are disclosed that enable an electronic document signature service to ensure that it stores electronic documents on servers within particular geographic boundaries by tracking and verifying the geographic locations of the servers. The service uses data received from the servers that identifies the geographic locations of the servers. The service also verifies the geographic locations of the servers based on network information associated with the sending of the data. One exemplary technique involves receiving data that includes geographic location identifiers that identify the geographic locations of the servers. The technique further involves verifying the geographic locations of the servers based on geographic locations associated with Internet Protocol (IP) addresses of network locations from which the data was sent. The geographic locations of the servers are then used to identify an appropriate and/or best performing server to store an electronic document during an electronic document signing process.

20 Claims, 10 Drawing Sheets

200

US → US, EU, JP, Germany
EU → EU, Germany
Germany → Germany
JP → JP

{Server: USEast1, Geographic locations: [Nashville, Kentucky, US]}
{Server: USEast2, Geographic locations: [Atlanta, Georgia, US]}
{Server: USWest1, Geographic locations: [San Jose, California, US]}
{Server: EUCentral1, Geographic locations {Munich, Germany, EU}}
{Server: JPKanto1, Geographic locations: [Tokyo, Kanto, JP]}

401 — Receive data sent from servers that includes geographic location identifiers 402 — Verify the geographic locations of the servers 403 — Determine the users and the geographic locations of the users 404 — Identify geographic boundaries for storing the electronic document 405 — Identify a server within the geographic boundaries for storing the electronic document 406 — Store the electronic document at the server

FIGURE 4

STORING, MIGRATING, AND CONTROLLING ACCESS TO ELECTRONIC DOCUMENTS DURING ELECTRONIC DOCUMENT SIGNING PROCESSES

TECHNICAL FIELD

This disclosure relates generally to systems and techniques that facilitate the signing and storage of electronic documents using electronic communication networks and servers.

BACKGROUND

Electronic document signature services facilitate various electronic document signing processes. For example, an individual in Atlanta, Ga. can create an electronic document and use an electronic document signature service to send the electronic document to an individual in San Jose, Calif. for signature. The individual in San Jose receives the electronic document and uses the electronic document signature service to sign the document, for example, by filling out one or more fields and/or adding an electronic signature. The electronic document, including information about the users involved, is stored to create a record of the signing process and make the electronic document available for later use. The electronic document is typically initially stored on a server when the sender initiates the signing process. The electronic document is provided from the server to the signers for completion and information that is received from the signers is sent back to the server. For example, when a signer completes fields and adds a signature to an electronic document, that information is sent for storage at the server as part of the electronic document.

Existing electronic document signature services are unable to ensure that electronic documents and associated user information is stored on servers within particular geographic boundaries, i.e., within particular countries, states, cites, etc. Data storage requirements provided by users, governments, and other sources frequently require that electronic documents and information about the users involved in the electronic document signing process be stored within particular geographic boundaries. Existing services cannot ensure that electronic documents and information is stored within such geographic boundaries because the geographic locations of the servers used by the services are often unknown, not known with sufficient precision, not known with sufficient certainty, and change over time. Similarly, existing electronic document signature services are unable to ensure that the electronic documents are sent via electronic communications within particular geographic boundaries. For example, the services cannot ensure that an electronic document is not sent outside of the European Union while in route from a sender in France to a server in Germany.

In addition, existing electronic document signature services generally do not ensure the use of servers that perform well in terms of efficient communications, response times, bandwidth, and available storage. For example, if the sender is in the United States and the signing process involves ten signers who are all in Germany, existing services may store the electronic document in the United States. However, this will very likely be inefficient since most of the electronic communications will be between the signers in Germany and the server in the United States. Storing the electronic document in Germany rather than the United States could improve the efficiency of electronic communications involved in the signing process and subsequent accesses of the electronic document by the signers.

Existing electronic document signature services also do not adequately respond to network issues and other changed circumstances by moving electronic documents to different servers. For example, a new server may be required based on a network issue, such as server maintenance or a server outage. Existing techniques generally interrupt and cancel a signing process in response to such an issue. In another example, a new server may be required or desired when new information becomes known about a user. For example, based on a signer identifying his geographic location during the signing process, using a different server than the current server may be desirable or required. Using a new server may improve performance by reducing the wait times of the sender and signer in electronic communications to receive and update the electronic document. Similarly, using the new server may ensure compliance with a data storage requirement that requires storing the electronic documents within particular geographic boundaries. Existing techniques do not migrate electronic documents in response to such circumstances within particular geographic boundaries.

SUMMARY

Systems and techniques are disclosed that enable an electronic document signature service to ensure that it stores electronic documents on servers within particular geographic boundaries by tracking and verifying the geographic locations of the servers. The service uses data received from the servers that identifies the geographic locations of the servers. The service also verifies the geographic locations of the servers based on network information associated with the sending of the data.

One exemplary technique involves receiving data that includes geographic location identifiers that identify the geographic locations of the servers. The technique further involves verifying the geographic locations of the servers based on geographic locations associated with Internet Protocol (IP) addresses from which the data was sent. The geographic locations of the servers are then used to identify a server to store an electronic document during an electronic document signing process. The signing process involves a sender sending the electronic document for signature by a signer and the signer signing the electronic document. During the signing process, the geographic locations of the sender and the signer are determined and used, along with the geographic locations of the servers, to select a server to store the electronic document. Specifically, geographic boundaries for storing the electronic document are identified based on the sender geographic location, the signer geographic location, and data storage requirements applicable to storing the electronic document. A server is then identified within the geographic boundaries for storing the electronic document based on the geographic locations of the servers. The electronic document is then stored at the server.

Systems and techniques are also disclosed herein that ensure compliance with data storage requirements by controlling access to electronic documents and user information on servers in different geographic locations. How users access electronic documents is controlled to avoid storing user-provided information on one server and then moving the information to another server. Moving stored user-information from one server to another server in another geographic location, for example, may be prohibited by a data storage requirement. Access is controlled based on associating the individual users with particular servers (i.e., each user's home server) that the users authenticate themselves on and use to access the signature service. An electronic document that is originated by a sender is only stored on the sender's home server. When a signer accesses the electronic document to view, complete, or sign the electronic document, various techniques are used to give the signer access to the electronic document without storing the electronic document on the signer's home server. Similarly, when the signer provides a signature and other information to complete the document, the signer-provided information is provided directly for storage on the sender server without storing the information on the signer's home server.

One exemplary technique controls access to an electronic document in a signature process between a sender and a signer that access a signature service using instances of an application provided by different servers. The sender server receives an instruction from a device of the sender for the signature service to send the electronic document for signature by the signer. The sender server is the server that has a first instance of the application that the sender device uses to access the signature service, i.e., it is the sender's home server. The electronic document is stored at the sender server based on the sender device using the first instance of the application provided by the sender server. The signer uses a signer device that accesses the signature service using a second instance of the application provided by a signer server and thus does not initially have access to the electronic document on the sender server. During the signing process, the sender server receives a direct access request with signer information from the signer server. The sender server grants the signer direct access to the electronic document based on the signer information and sends a communication with an image of the electronic document directly to the signer. In this example, the signer device is able to access the electronic document directly to view or add a signature and other information to the electronic document without the electronic document being stored on the signer server. The technique enables a signature process involving users associated with different home servers in different geographic locations without transferring the electronic document from one server to another.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 is a block diagram illustrating a compatibility mapping.

FIG. 3 is a block diagram illustrating a server-to-geographic location mapping.

FIG. 4 is a flow chart illustrating an exemplary technique for storing an electronic document during an electronic document signing process.

DETAILED DESCRIPTION

Figure 1:
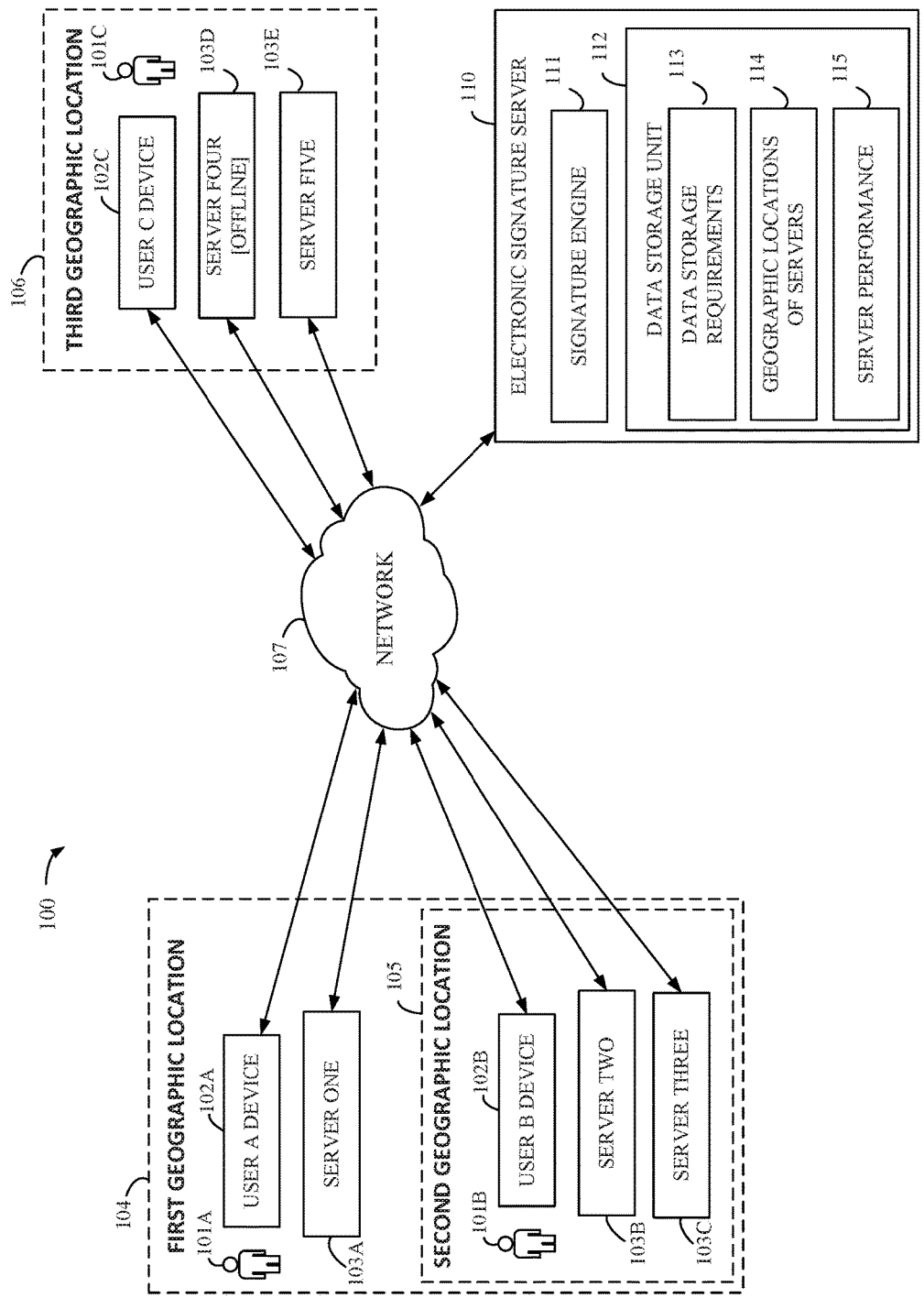
FIG. 1 is a diagram of an environment in which one or more techniques of the invention can be practiced.

As discussed above, existing electronic document signature services are unable to ensure that electronic documents are stored on servers within particular geographic boundaries, i.e., within particular countries, states, cites, etc. Techniques disclosed herein enable an electronic document signature service to ensure that it stores electronic documents on servers within particular geographic boundaries by tracking and verifying the geographic locations of the servers. Data is received from the servers that includes geographic location identifiers that identify their geographic locations. For example, a first server may send a message that identifies its own latitude and longitude coordinates and/or street address.

The techniques disclosed herein additionally verify the geographic locations of the servers based on geographic locations associated with the Internet Protocol (IP) addresses from which the data was sent. To do so the electronic document signature service can access a geolocation service, Regional Internet Registries, and/or its own datasets that associate IP addresses with geographic locations. In one example, the IP address from which a server sent data is used to identify the geographic location of an associated Internet Service Provider (ISP). The geographic location of the ISP is then used to verify the geographic location of the server. For example, the geographic location provided in the data from the server can be verified by confirming that it is within a predetermined threshold distance of and/or within the same country, state, city, and/or zip code as the geographic location of the ISP.

The electronic document signature service maintains a dataset identifying the geographic locations of the servers. During an electronic document signing process when the electronic document needs to be stored, the service looks-up the geographic locations of the servers in the dataset. The service can additionally or alternatively receive data communications from the servers to determine and/or verify the geographic locations of the servers during the signature process when a server is to be selected for use.

The geographic locations of the servers are used to identify an appropriate server to store an electronic document during an electronic document signing process. The signing process involves a sender sending the electronic document for signature by a signer and the signer signing the electronic document. During the signing process, the geographic locations of the sender and the signer are determined and used, along with the geographic locations of the servers, to select a server to store the electronic document. Specifically, geographic boundaries for storing the electronic document are identified based on the sender geographic location, the signer geographic location, and data storage requirements applicable to storing the electronic document. For example, the sender may be located in the United States, the signer may be located in Germany, and a data storage requirement may require that all electronic documents for German users be stored in the European Union. Based on this, the technique identifies the geographic boundaries of the European Union for storing the electronic document. A server is then identified within the geographic boundaries, e.g., within the European Union, for storing the electronic document based on the geographic locations of the servers. For example, the techniques may identify that there are ten servers within the European Union and arbitrarily select one of the servers to store the electronic document. The electronic document is then stored at the selected server.

Existing electronic document signature services generally do not ensure the use of servers that perform well in terms of efficient communications, response times, bandwidth, and available storage. Specifically, existing techniques do not account for sender and signer geographic locations and server performance attributes in storing electronic documents. Techniques disclosed herein address these issues by identifying and using the geographic locations of the sender and signer to select a server. The geographic locations of the sender and signer are determined and verified from one or more sources. For example, geographic locations of the sender and signer may be determined from user profiles maintained by the service on the sender and signer, based on IP addresses used by the sender and signer, and/or based on input received from the sender and signer. Using the geographic locations of the sender and signer to select a server can improve system performance in various ways. For example, a server can be selected to minimize the distance of expected communications involving the sender, the signer, and the server during the signature process, to improve the speed and efficiency of those communications. Since the geographic locations of the servers are also known, a server can be selected that is central to the geographic locations of the users, within a predetermined threshold distance of the most number of users, or based on other geographic location-based selection criteria.

The selection of the server can also account for performance attributes associated with the server. In one example, the electronic document signature service receives data from the servers that identifies the available storage, response times, bandwidth, and/or other performance data for each of the servers. This information can be accounted for in selecting a server to use for an electronic document. In one example, the service is configured to select a server within specified geographic boundaries that has at least 20% (or any other appropriate threshold percentage) of its storage available.

The digital nature of the electronic document signing process creates additional problems for selecting a server because the electronic document must be stored during the signing process. In many instances, a server must be selected and used before the signing process is complete and before the geographic locations of one or more signers is known. For example, when a sender creates and sends the electronic document for signature, the electronic document must generally be stored while it is sent to the signers for signature. This creates the problem of determining where to store the electronic document during the signing process while geographic location information about one or more of the signers is unknown. It also creates the problem of how to handle moving the electronic document based on additional information about the signers and/or other changed circumstances.

Techniques disclosed herein address the problem of selecting where to store electronic documents when information about the signers is unknown in ways that avoid the unnecessary migration of electronic documents. Electronic documents are migrated from one server to another in appropriate circumstances. For example, an electronic document is migrated to a new server based on a newly-determined signer geographic location when a data storage requirement prohibits data about the signer from being stored at the original server. The electronic document may be initially stored at the original server when the geographic location of the signer is unknown. The electronic document is migrated to a new server when the signer geographic location is determined and the original server identified as incompatible. However, techniques disclosed herein are able to avoid such migrations in many circumstances by determining or estimating the geographic location of the signer at an earlier point in the signing process, before the electronic document is initially stored. As a result, the electronic document can be stored initially on an appropriate server and no migrations are required during the signing process.

Techniques of the invention address the issue of unnecessary migrations by determining geographic locations of the signers as early as possible in the signing process. In one example, a sender from the United States uses an electronic document signature service to send an electronic document for signature by a signer. If possible, the geographic location of the signer is determined prior to storing the electronic document and sending it for signature. In this example, the signer also has an account with the electronic document signature service. The signer's profile, maintained by the service, identifies that the signer resides in Paris, France. In an alternative example, the signature service requests input from the sender and the sender identifies the signer's geographic location based on what the sender knows about the signer. A server is then determined based on the geographic locations of the signer and sender. The electronic document is stored at that server from the beginning of the signing process. By determining an appropriate server prior to storing and sending the electronic document for signature, this technique avoids the need to migrate the electronic document from an incompatible original server, such one in the United States, to a new server located elsewhere, such as one in France. This reduces the network usage, the chance of an error occurring, and the complexity of the information that is recorded about the signing process.

Techniques disclosed herein also address network issues that occur when migrating electronic documents from one server to another. Migrating data from one server to another creates the potential for errors and inconsistencies. Techniques disclosed herein manage the storage of the electronic document on multiple servers and the interactions of the users in the signing process during data migrations to avoid errors and inconsistencies. The techniques store new information for an electronic document in the new server while previously-stored information is migrated to a new server. The migration does not delay the signing process because the new data is stored right away and later merged with the original data. Moreover, the original data is marked during the migration to prevent data inconsistences from occurring. In one example, a sender from the United States sends an electronic document for signature by a signer whose geographic location, France, is not known when the electronic document is to be sent to the signer for signature. The electronic document is initially stored at a server in the United States but is later migrated to a server in France. Specifically, when the signer receives the electronic document for signature and identifies that he is located in France, the technique identifies that a migration to a new server, in France, is necessary. The migration of the electronic document from the United States to France may take several minutes or hours to complete. Rather than requiring the signer to wait to sign and store the electronic document, the technique stores the signer information at the new server before or while the electronic document is being migrated from its current server. To avoid inconsistency issues, the electronic document is annotated on the current server during the migration to indicate that the electronic document is in transit to the new server. This prevents another user from interfering with the migration or creating an inconsistency in the electronic document. In this example, the technique is able to avoid errors, inconsistencies, and unnecessary user delays while migrating the electronic document.

Techniques disclosed herein additionally or alternatively address network issues such as server maintenance and server outage issues and other changes in circumstance requiring migration. As examples, it may be advantageous to migrate an electronic document from one server to another server for speed, efficiency, server maintenance, or to address a server outage or other network issue. The electronic document signature service automatically identifies a change such as a server being taken offline for maintenance or an undesirable circumstance such as a server with a response time longer than a predetermined threshold. After identifying such a change or circumstance, the service determines a new server for the electronic document, migrates the electronic document to the new server, and creates a record of the migration. In this way, the service is able to address network outages, perform maintenance, and otherwise respond to technical issues and requirements.

Techniques disclosed herein additionally or alternatively ensure that communications with servers during the electronic document signing process remain within geographic boundaries. Specifically, the electronic document signature service specifies communications that use specific network routers within particular geographic boundaries. The geographic locations of the network routers are determined or tracked. The communication paths that are used for communications with the servers are specified by using an overlay network that provides a logical network on top of the low layer communication network. The communication path is specified using the overlay network to ensure that the routers involved are within specified geographic boundaries.

Techniques disclosed herein additionally or alternatively provide notifications to users when there is no compatible server available, i.e., no server that is compatible with applicable data storage requirements. In such circumstances, the techniques provide user notifications to identify the issue during the signing process. In one example, the electronic document signing process is cancelled when a compatible server cannot be determined. Alternatively, the electronic document signing process can be paused when a compatible server cannot be determined. For example, if the only server within required geographic boundaries is offline for the next hour, the service provides a notification of the issue when it arises and later sends another notification to continue the signing process when the server becomes available. In another example, the service receives input from a user to consent to storing an electronic document on a server that is not compatible with a data storage requirement. For example, a data storage requirement may allow a user to consent to waive the requirement so that the user's information can be stored on a server in a geographic location that would otherwise not be permitted by the data storage requirement. The consents are recorded to create an accurate record of compliance with the data storage requirements.

Techniques are also disclosed herein that ensure compliance with data storage requirements by controlling access to electronic documents and user information on servers in different geographic locations. Access is controlled to avoid storing user-provided information on one server and then moving the information to another server. Moving stored user-information from one server to another server in another geographic location, for example, may be prohibited by a data storage requirement. Access is controlled based on associating the individual users with particular servers. Each of the servers executes an instance of an application that provides access to the signature service to some of the users and thus acts as the "home" server to those users. For example, a user in the U.S. accesses the service via a server in the U.S. using a U.S.-specific uniform resource locator (URL) while a user in Germany accesses the service a server in Germany using a Germany-specific URL. The home server associated with each user stores the user's profiles, stores the electronic documents originated by the user, and processes all of the electronic documents originated by the users. Access to electronic documents and user information is controlled by limiting and/or restricting the transfer of information between servers. Access is also controlled using techniques that enable communications directly between users and servers other than the users' home servers in appropriate, limited circumstances.

During an electronic document signing process, sender-provided information is only stored on the sender's home server (i.e., the sender server). The sender originates an electronic document and sends the electronic document for signature to a signer. The sender-provided information, including the electronic document to be signed, is stored on the sender server. The signing process is completed without storing the electronic document on any other server in any other geographic location. Specifically, the techniques enable a signer who is associated with a different home server (i.e., a signer server) to sign the electronic document by having the signer's computing device interact directly with the sender server. The signer will login and generally interact with the signature service using the signer server. For example, the signer will use the signer server to manage his electronic document, user profile, and his own originate electronic documents for signature by others. However, when the signer is to sign the electronic document that resides on the sender server, the signer is granted permission to access the sender server directly. Thus, the signer's computing device communicates directly with the sender server without having to go through the signer server. In one example, the signer is federated at the sender server and is thus the signer's device is able to access the sender server directly. An image of the electronic document is provided directly from the sender server to the signer device. When the signer signs the electronic document and provides input for the electronic document, the signature and/or inputted information are sent directly to the sender server and stored with the electronic document on the sender server. In this way, the electronic document is stored on the sender server throughout the signing process. There is no transfer of the electronic document from the sender server to the signer server. The information provided by the sender (e.g., the electronic document) is only stored on the sender server and is not transferred to the signer server. In this example, the technique complies with a data storage requirement by only storing the sender-provided information (e.g., the electronic document) on the sender server during the signing process.

Signer information is also controlled during the electronic document signing process. Two different types of signer information are controlled. The first type of signer information is information that is stored about the signer at the signer server. Such signer information includes, the signer's profile information and the electronic documents that the signer has originated. The signing process is completed while transferring little or none of this signer information outside of the signer server. In one example, limited signer information is provided to the sender server to facilitate federating the signer on the sender server. For example, only the signer's e-mail address may be provided to the sender server. Other information from the signer's user profile and electronic documents remains only on the signer server. In this example, the technique complies with a data storage requirement by storing the signer information on the signer server during the signing process and sharing only limited information, such as information not covered by the data storage requirement, with the sender server.

The second type of signer information that is controlled is information that is provided by the signer during the electronic document signing process to be included in the electronic document. For example, the electronic document may include a webpage with an image of the electronic document and hyper-text-markup-language (HTML) fields overlain on top of the image for the signer to provide information. The signer retrieves and completes the webpage on the device. The signer interacts with the fields to provide information such as the signer's name, address, credit card information, social security number, signature, etc. This signer-provided information is sent directly to the sender server and is not stored on the signer server. In this example, the technique complies with a data storage requirement by avoiding the transfer of signer-provided information from the signer server to the sender server.

Techniques disclosed herein provide electronic document signature services using separate instances of a signature service application on separate servers while providing a seamless user experience. A user is able to view a list of all of the electronic documents that the user has participated in, regardless of where the electronic documents reside. The user interface is provided to the user from the user's home server and allows the user direct access to electronic documents that are stored at the user's home server. The user interface identifies other electronic documents that the user has participated in based on pointers to those electronic documents. When the user selects to access an electronic document that resides at a remote server, the user is federated to the remote server and the user's device is able to interact directly with the remote server to allow the user to view the electronic document. Specifically, an image of the electronic document is provided from the remote server directly to the user's device without storing the electronic document on the user's home server. In this example, the technique complies with a data storage requirement by only storing the electronic document on the remote server while also allowing the user to access the electronic document.

In these examples, multiple, separate instances of an application on different servers in different geographic locations are used to provide a single unified signature service. The users experience the electronic signature service as a whole and are able to originate, complete, sign, and view their electronic documents without regard to where the electronic documents are stored. The information for an electronic document is stored at a server associated with a single instance of the signature service application (i.e., on the sender's home server) and pointers on the signer server point back to the sender's server so that the electronic document can be accessed by the signer. The electronic document itself, however, is only stored and manipulated on the sender server.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "electronic document" refers to any electronic media content that represents information using text, images, or other items that can be displayed on a display of a computing device. Electronic documents can be stored as one or more files on a computer-readable medium. Examples of electronic documents include, but are not limited to, word processing files that are created by entering text, images, and other items onto one or more pages, images of hand-written papers that are created by scanning the hand written papers, contracts, agreements, and other representations of content that are signed by one or more users for execution, verification, authorization, and any other purposes.

As used herein, the phrase "data storage requirement" refers to any rule or law that requires an electronic document to be stored within particular geographic boundaries. A data storage requirement can apply depending on particular circumstances, such as the electronic document including information from particular users. For example, a user may specify a data storage requirement that requires all of the user's electronic documents to be stored within the user's own country. As another example, a business may specify a data storage requirement that requires that all of the business' electronic documents be stored in the state of its headquarters. A data sovereignty requirement is one example of a data storage requirement. Data sovereignty requirements restrict the use of personal information to remain within particular geographic boundaries. Many governments require resident names, addresses, signatures, and other personal information to be physically stored within their borders. The data sovereignty requirements of these governments prohibit the sending and storing of the resident information outside of their borders.

As used herein, the phrase "geographic location" refers to refers to a position or area that is identifiable based on an address, coordinates, or other geographic description. Examples of geographic locations include, but are not limited to street addresses, towns, cities, states, countries, or particular latitude and longitude combinations. In one example, the geographic location of a sender is the city in which the sender resides. In another example, the geographic location of a server is the street address of a building in which the server is located. Data storage requirements require that electronic documents be stored within particular geographic boundaries associated with particular geographic locations. For example, a data storage requirement may require that data for German users be stored with Germany and thus within the geographic boundaries of Germany.

As used herein, the phrase "geographic boundaries" refers to boundaries around one or more geographic locations. For example, a nation's geographic boundaries surround or otherwise identify the geographic location over which the nation has authority. A nation's data sovereignty requirements may prohibit transmitting and/or storing personal data about the residents of the nation outside of the nation's geographic boundaries. Examples of entities that have geographic boundaries include, but are not limited to, international unions such as the European Union, countries such as the United States, France, Germany, and Japan, states such as Georgia and California, cites, counties, and towns.

As used herein, the phrase "electronic document signing process" refers to a sender sending an electronic document for signature by one or more signers, the one or more signers signing the electronic document, and/or the storage of the electronic document for later retrieval and use. An electronic document signing process can be facilitated by an electronic document signature service that provides an interface for the sender to send the document for signature and/or for the one or more signers to sign the electronic document.

As used herein, the phrase "user" refer to any participant in an electronic document signing process. Senders and signers are examples of users.

As used herein, the phrase "signature" refers to a depiction of a name or other mark that a person adds to an electronic document as proof of the person's identity and intent or as proof of the identity and intent of another person or entity on behalf of whom the person is signing. For example, a person may sign an electronic document to execute the document, form a contract, verify the accuracy or truthfulness of the document, provide an authorization, and for various other purposes.

As used herein, the phrase "compatible" refers to storage of an electronic document being permitted based on data storage requirements that apply to the electronic document. For example, if the data storage requirement for an electronic document requires that the signer's information can only be stored in the European Union, the European Union is a compatible geographic location and servers within the European Union are compatible servers for storing the electronic document. Geographic locations outside of the European Union are incompatible geographic locations and servers outside of the European Union are incompatible servers for storing the electronic document.

As used herein, the phrase "direct access" refers to a computing device requesting and/or receiving electronic content from a server without the data being stored on another server. In one example, a signer uses a signer server to access a signature service and is granted direct access to receive an electronic document from a sender server without the electronic document being stored on the signer server.

As used herein, the phrase "application stack" refers to a suite or set of one or more applications programs that help provide one or more tasks or services. Applications in an application stack are typically closely linked together such that data can be exported and imported among them with minimal steps. A service, such as a signature service, can be provided by multiple instances of an application stack on multiple servers. In one example, each instance of an application stacks provides the functionality of a signature service to a specific set of users, i.e., each user has a "home" application stack used to access the signature service. Techniques disclosed herein enable users to use and interact with electronic documents stored on their home application stacks and remote application stacks.

Exemplary Computing Environment

FIG. 1 is a diagram of an environment 100 in which one or more embodiments of the present disclosure can be practiced. The environment 100 includes users 101A-C, user devices 102A-C, servers 103A-E, and an electronic signature server 110. The environment 100 includes a first geographic location 104, a second geographic location 105, and a third geographic location 106. The geographic locations 104, 105, 106 are areas with corresponding geographic boundaries. User A device 102A, which is used by user 101A, and server one 103A are within the geographic boundaries of the first geographic location 104. The second geographic location 105 is also within the geographic boundaries of the first geographic location 104. For example, the first geographic location 104 could be the European Union and the second geographic location 105 could be France. User 101B, user B device which is used by user 101B, server two 103B, and server three 103C are within the geographic boundaries of the second geographic location 105. User 101C, user C device 102C which is used by user 101C, server four 103D, and server five 103E are within the geographic boundaries of the third geographic location 106. The environment 100 includes a limited number of user devices, servers, and geographic locations to facilitate understanding of the inventive concepts. Real world environments will typically include many more user devices, servers, and geographic locations.

Examples of the user devices 102A-C include, but are not limited to, a personal computer (PC), a tablet computer, a desktop computer, a laptop, mobile phone, a tablet, a processing unit, any combination of these devices, or any other suitable device having one or more processors. Each user device includes at least one application supported by the electronic signature server 110. For example, electronic signature server 110 may provide a webpage that provides an interface on the user devices 102A-C for sending and/or signing electronic documents. Servers include any computing devices that are capable of storing electronic document and making the electronic documents available to users via a network.

The electronic signature server 110 communicates with the user devices 102A-C and the servers 103A-E via network 107. Examples of the network 107 include, but are not limited to, the Internet, a local area network (LAN), a wireless area network, a wired area network, a wide area network, and the like.

The electronic signature server 110 includes a signature engine 111. The signature engine 111 provides an interface on the user devices 102A-C for sending and/or signing electronic documents. For example, user 101A may use user device 102A to download and use a webpage that provides the interface. The user 101A can use such a webpage to upload an electronic document to the signature engine 111, identify locations (e.g., by adding fields) on the document for a signer to add a signature, date, and/or other signer information, specify an e-mail address or other identification information of a signer, and initiate sending of the electronic document to the signer. If user 101A identifies user 101B as the signer, the signature engine 111 sends the document for signature to user 101B. User 101B uses user B device 102B to access the electronic document for signature. For example, user 101B may use user device 102B to request the webpage interface from the signature engine 111. The webpage interface allows user 101B to preview the electronic document and add the signature, date, and/or other information. The user 101B then submits the signed electronic document.

During the electronic signature process facilitated by signature engine 111, the signature engine 111 also controls the storage of the electronic document. The signature engine 111 stores the electronic documents so that the electronic documents can be efficiently accessed by the users while also ensuring compliance with the data storage requirements 113. For example, the signature engine 111 stores the electronic document in an appropriate server at various points during the signing process. For example, the electronic document may be stored at a server at the point when the electronic document is sent to the signer for signature. For example, to send the document to the signer, the signature engine may send a link or button that allows the signer to download the electronic document from the server.

The signature engine 111 determines a server to store the electronic document based on the information that is available at the current point in the signing process. For example, if user 101A sends the electronic document to user 101C, the signature engine 111 can determine if the geographic location of user 101C can be determined before sending the document for signature to user 101C. For example, the signature engine 111 may ask the sender, user 101A, to identify the geographic location of user 101C. In another example, the signature engine 111 is able to determine the geographic location of user 101C using a profile of the user 101C that is accessible to the signature engine.

If the signature engine 111 is able to determine the geographic location of the signer prior to contacting the signer, user 101C, it determines an appropriate server based on both the sender geographic location (which is within first geographic location 104) and the signer geographic location (which is within the third geographic location 106). To determine an appropriate server, the signature engine 111 determines geographic boundaries in which the server should or must be located and then identifies a server within those geographic boundaries. The data storage requirements 113 identify geographic boundaries within which an electronic document should or must be stored based on the geographic locations of the users. In one example, the data storage requirements 113 require that the electronic document be stored within particular geographic boundaries associated with the sender and signer. For example, they may require that the electronic document be stored in either the country of the sender or the country of the signer. In another example, the data storage requirements may require that information about any user within a particular geographic location, e.g., within the third geographic location, must be stored within that geographic location. If the geographic location of the sender or signer is within the third geographic location 106, then the electronic document must be stored on a server within the geographic boundaries of the third geographic location 106. In one embodiment, the signature engine 111 uses a compatibility mapping to determine the geographic boundaries in which an electronic document must be stored. The compatibility mapping identifies, for a given geographic location of a user, the geographic boundaries within which the user's data must be stored based on the data storage requirements. An example of a compatibility mapping is discussed below with reference to FIG. 2.

After identifying geographic boundaries for storing an electronic document, the signature engine 111 identifies a server within the geographic boundaries to store the electronic document. To do so, the signature engine 111 accesses information about the geographic locations of the servers capable of storing the electronic document. The signature engine 111 receives data from the server 103A-E that identifies the geographic location of each of the servers, e.g., the city of each server, the street address of each server, the latitude/longitude coordinates of each server, etc. The signature engine 111 also verifies the geographic locations of the servers based on geographic locations associated with the Internet Protocol (IP) addresses from which the data was sent. To do so the service can access a geolocation service, Regional Internet Registries, and/or its own datasets that associate IP addresses with geographic locations. In one example, the IP address from which a server sent data is used to identify the geographic location of an associated Internet Service Provider (ISP). The geographic location of the ISP is then used to verify the geographic location of the server. For example, the geographic location provided in the data from the server can be verified by confirming that it is within a predetermined threshold distance of and/or within the same country, state, city, and/or zip code as the geographic location of the ISP. The geographic locations 114 of the server 103A-E are stored on the electronic signature server 110.

The signature engine uses the geographic locations 114 of the servers 103A-E to identify an appropriate server within the geographic boundaries determined for storing the electronic document. For example, if the geographic boundaries are boundaries of geographic locations 106, then servers 103D and 103E are identified based on their respective geographic locations being within the geographic boundaries of geographic location 106. In one example, the signature engine uses a server-to-geographic location mapping to determine which servers are within the geographic boundaries of particular geographic locations. An example of a server-to-geographic location mapping is discussed below with reference to FIG. 3.

The signature engine 111 can additionally or alternatively store information about server performance 115 and use the server performance 115 to identify the server within the geographic boundaries. For example, if the information about server performance 115 identifies that server 103D is offline, server five 103E is selected to store the electronic document. In another example, multiple servers within the geographic boundaries are identified and one of the servers is selected based on efficiency criteria that accounts for the geographic locations of the sender and signer and/or the server performance 115. For example, a server can be selected based on efficiency criteria that selects the server at a geographic location that is most central to the geographic locations of the users. In another example, the efficiency criteria can specify that a server is selected by selecting a geographic location in which the most number of the users are located. In another example, the server is selected by selecting the server that has the best availability and/or average response time amongst the server within the geographic boundaries.

Once a signature and/or other information is received from the signer, user 101C, this information is also stored at server five 103E. If the signature engine 111 is unable to determine the geographic location of the signer prior to contacting the signer, it stores the electronic document based on the currently available information and sends the document for signature by signer from this server. For example, based on the sender (user 101A) being in the first geographic location 104, the electronic document may be initially stored in server one 103A in the first geographic location 104. The electronic document is then sent to the signer (user 101C) for signature. At this point, the signer geographic location is determined. For example, the signer may provide input identifying his street address. Based on the signer geographic location, it me be desirable or required to use a different storage location. For example, storing the electronic document on the current server may be incompatible with a data storage requirement. Based on the signer geographic location and/or other detected conditions, the signature service 111 can determine to migrate the electronic document from the original server to a new server. For example, the electronic document may be migrated from server one 103A within the geographic boundaries the first geographic location 104 to server five 103E within the geographic boundaries of the third geographic location 106. The signature and any other signer information is stored only at the server five 103E in the third geographic location 106.

FIG. 2 is a block diagram illustrating a compatibility mapping 200. The compatibility mapping 200 identifies, for a given geographic location of a user, the geographic boundaries within which the user's data must be stored based on the data storage requirements. The compatibility mapping 200 identifies that data for a user in the United States (US) can be stored on a server in the U.S., European Union (EU), Japan (JP), and Germany. The compatibility mapping 200 further identifies that data for a user in the EU can be stored on a server within the EU and Germany. The compatibility mapping 200 also identifies that data for a user in Germany must be stored on a server within Germany and that data for a user in Japan must be stored on a server within Japan. The compatibility mapping 200 is simplified for illustrative purposes and would include many more geographic locations in real world implementations. For example, all countries in the EU could be listed for the U.S. and EU. The geographic locations can be as fine grained as is justified by the data sovereignty requirements. For example, if a city or township creates a data storage requirement, that city or township can be included in the compatibility mapping 200.

The compatibility mapping 200 can be generated using various techniques. In one example, the compatibility mapping 200 is generated by aggregating the data storage requirements from multiple sources. For example, information about the data sovereignty requirements of the multiple geographic locations from multiple sources may be received via input or automatically retrieved and used to create the mapping. In one example, the data storage requirements of each geographic location are published electronically on a website or other network resource. The compatibility mapping is aggregated by downloading or otherwise receiving information from these resources. For example, a government may publish a list of geographic locations that are compatible with it or provide a rule from which such a list can be determined. Techniques disclosed herein download and analyze such lists and rules to determine the compatibility mapping. The techniques can additionally monitor websites and other electronic publications that have such lists and rules for changes and initiate updating of the compatibility mapping when a change is detected.

The updating of the compatibility mapping 200 can be performed by or monitored by legal advisors acting on behalf of an electronic document signature service rather than by the individual users of the service. The compatibility mapping 200 provides a single resource of aggregated compatibility information that multiple users can use. It provides a centralized repository of up-to-date compatibility information that users have the benefit of without having to maintain themselves. This can significantly reduce the burden on users of the signature service.

FIG. 3 is a block diagram illustrating a server-to-geographic location mapping 300. The server-to-geographic location mapping 300 shows that the server USEast1 is in the following geographic locations: Nashville, Kentucky, US. It also shows that the server USEast2 is in the following geographic locations: Atlanta, Ga., US and that the server USWest1 is in the following geographic locations: San Jose, Calif., US. It further shows that the server EUCentral1 is in the following geographic locations: Munich, Germany, EU and that the server JPKanto1 is in the following geographic locations: Tokyo, Kanto, JP. The server-to-geographic location mapping 300 is simplified for illustrative purposes and would include many more servers and geographic locations in real world implementations. The server-to-geographic location mapping 300 provides an efficient way to determine whether a particular server is within particular geographic boundaries by determining whether the server is within a geographic location defined by the geographic boundaries.

The server-to-geographic location mapping 300 can be generated using various techniques. In one example, the server-to-geographic location mapping 300 is generated by tracking geographic locations of servers. A variety of techniques are used alone or in combination with one another to identify or estimate the geographic locations of servers. For example, the geographic locations of the servers can be recorded when the servers are installed or moved. In one embodiment, the servers provide data that identifies their geographic locations, e.g., the city of each server, the street address of each server, or the latitude longitude coordinates of each server. The geographic locations of the servers can be verified based on geographic locations associated with the Internet Protocol (IP) addresses from which the data from the servers is sent. In one example, the IP address from which a server sent data is used to identify the geographic location of an associated Internet Service Provider (ISP). The geographic location of the ISP is then used to verify the geographic location of the server. For example, the geographic location provided in the data from the server can be verified by confirming that it is within a predetermined threshold distance of and/or within the same country, state, city, and/or zip code as the geographic location of the ISP.

Geographic locations of the servers and/or the server-to-geographic location mapping 300 can be updated by an electronic document signature service rather than by the individual users of the service. This provides a centralized repository of up-to-date information that users have the benefit of without having to maintain themselves. This can significantly reduce the burden on users of the signature service.

Exemplary Techniques for Storing an Electronic Document

FIG. 4 is a flow chart illustrating an exemplary technique 400 for storing an electronic document during an electronic document signing process. The electronic document signing process involves a sender sending the electronic document for signature by a signer and the signer signing the electronic document. The exemplary technique 400 can be implemented on a user's local computing device, such as on user devices 102A-C, or on a remote computing device, such as on electronic signature server 110 of FIG. 1. However, other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices. The operations of various exemplary algorithms that can be employed to perform these functions are discussed throughout this specification.

Technique 400 involves receiving data from servers that includes geographic location identifiers, as shown in block 401. The geographic location identifiers identify the locations of the servers by identifying an address, coordinates, or other geographic description of each server. For example, the geographic location identifiers can include one or more of the street addresses, towns, cities, states, countries, and particular latitude and longitude coordinates. Geographic location identifiers can be included with communications sent by the servers sent when data is fetched from the servers, periodically, or based on periodic polling of the servers. The servers can be configured to send data with geographic location identifiers without being prompted. For example, each server may send a periodic message that includes the geographic location identifiers. Additionally, or alternatively, the servers can be configured to send the data any time the geographic location or other detectable change occurs at a server. For example, if an IP address associated with a server changes, the server may detect the change and, based on the changed IP address, send a message identifying the current geographic location of the server. Additionally, or alternatively, an electronic document signature service may send messages to the servers requesting the data with the geographic location identifiers. Such request messages can be sent by the service periodically and/or based on an event. In one example, the service requests data with geographic location identifiers at the time when an electronic message is to be stored on a server and a server is being selected for the storage.

Technique 400 further involves verifying the geographic locations of the servers, as shown in block 401. In one example, this involves verifying the geographic locations of the servers based on geographic locations associated with Internet Protocol (IP) addresses of network locations from which the data was sent. To do so the service can access a geolocation service, Regional Internet Registries, and/or its own datasets that associate IP addresses with geographic locations. In one example, the IP address from which a server sent data is used to identify the geographic location of an associated Internet Service Provider (ISP). The geographic location of the ISP is then used to verify the geographic location of the server. For example, the geographic location provided in the data from the server can be verified by confirming that it is within a predetermined threshold distance of and/or within the same country, state, city, and/or zip code as the geographic location of the ISP. In another example, routing characteristics of the network or tracked and the geographic location of the server is verified by comparing the latencies with latencies of devices at known geographic locations. In another example, global positioning system (GPS) devices are used at the servers and messages with geographic location information can be based on and/or verified with the GPS information. For example, messages can be configured to include a cryptographically-signed header from a GPS device.

Technique 400 further involves determining the users and the geographic locations of the users, as shown in block 403. The users can be identified using various techniques. In one example, the sender logs into the service and is identified based on his or her login credentials. In another example, the sender is asked for identifying information such as a name, account number, or e-mail address from which the sender is identified. The signers may be identified based on information provided by the sender. For example, the sender may choose send an electronic document to three signers for signature and provide an e-mail address for each of the three signers. In this example, the four users (i.e., the sender and the three signers) are identified. The sender is identified based on providing input identifying himself and/or based on having signed into an electronic document service using login credentials. The signers are identified based on the provided e-mail addresses or other identifying information provided by the sender.

A variety of techniques are used alone or in combination with one another to identify or estimate the geographic locations of the users. In one example, the geographic locations of the users are determined based on address information of the users in user profiles that are stored for the users by the signature service. In another example, the geographic locations of the users are determined by detecting the location of the users' devices used during the signing process. In another example, the users are prompted to provide input to identify their own geographic locations and/or to provide those of the other users involved in the signing process.

The geographic locations of the users in the signing process can be determined at different points in the signing process. For example, geographic locations of the sender and one of the signers may be determined prior to sending the document for signature based on information in user profiles maintained by an electronic document service for these users. The geographic locations of other two signers may not be known when the document is sent for signature but may be determined at later points in time, for example, when the signers receive the electronic document for signature and provide input identifying their respective geographic locations.

Technique 400 further involves identifying geographic boundaries for storing the electronic document, as shown in block 404. The geographic boundaries are determined based on the geographic locations of the users and/or data storage requirements. For example, if Germany requires that information about its residents remain in Germany, the geographic boundaries around Germany are identified for storing the electronic document. Geographic boundaries can be determined using a compatibility mapping, such as the compatibility mapping 200 of FIG. 2, which identifies for a given user location (e.g., the US), in which geographic locations (and corresponding geographic boundaries) information about the user may be stored.

Data storage requirements, such as compatibility mapping information included in a compatibility mapping, can be generated by aggregating the data storage requirements from multiple sources. For example, information about the data storage requirements of the multiple governments may be received from multiple electronic sources published by the governments. In one example, the data storage requirements are published electronically on a website or other network resource and a compatibility mapping is created by downloading or otherwise receiving information from these resources and aggregating the information into the mapping. For example, a government may publish a list of geographic locations in which its residents' information may be stored or provide a rule from which such a list can be determined. Techniques disclosed herein download and analyze such lists and rules to determine the compatibility mapping. The techniques can additionally monitor web sites and other electronic publications that have such lists and rules for changes and initiate updating of the compatibility mapping when a change is detected.

Technique 400 identifies a server within the geographic boundaries for storing the electronic document, as shown in block 405. A server-to-geographic location mapping such as the server-to-geographic location mapping 300 of FIG. 3 can be used to identify servers within the geographic boundaries of particular geographic locations. If there are multiple servers within the geographic boundaries, the technique 400 selects one of the servers. In such cases, the server can be selected arbitrarily. Alternatively, various criteria can be used to select an appropriate server from amongst multiple available options. In one example, geographic location of the sender and/or signer(s) are used to select one of the servers within the geographic boundaries. For example, a server can be selected to minimize the distance of expected communications involving the sender, the signer(s), and the server during the signature process, to improve the speed and efficiency of those communications. Since the geographic locations of the servers is also known, a server can be selected that is central to the geographic locations of the users, within a predetermined threshold distance of the most number of users, or based on other geographic location-based selection criteria. If the geographic boundaries include both the US and Germany and the sender is in the US and ten signers are in Germany, a server in or near Germany can be selected based on such criteria. In another example, the criteria can specify that a server is selected by selecting a server in a geographic location in which the most number of the users are located. For example, if two users are in the United States and three users are in Germany, Germany can be selected based on such criteria The selection of the server can also account for performance attributes associated with the server. In one example, the electronic document signature service receives data from the servers that identifies the available storage, response times, bandwidth, storage-bandwidth saturation, overall capacity saturation, predicted saturation in an upcoming time-period, and/or other performance data for each of the servers. This information can be accounted for in selecting a server to use for an electronic document. In one example, the service is configured to select a server within specified geographic boundaries that has at least 20% (or any other appropriate threshold percentage) of its storage available.

The technique 400 next stores the electronic document at the server, as shown in block 405. The information stored for the electronic document includes information provided by the sender and information provided by the signer(s), including any signatures provided by the sender and/or signer(s). In this way, the technique 400 ensures that the electronic document, including the personal information of the users, is stored at a server within the geographic boundaries in compliance with the data storage requirements.

Figure 5:
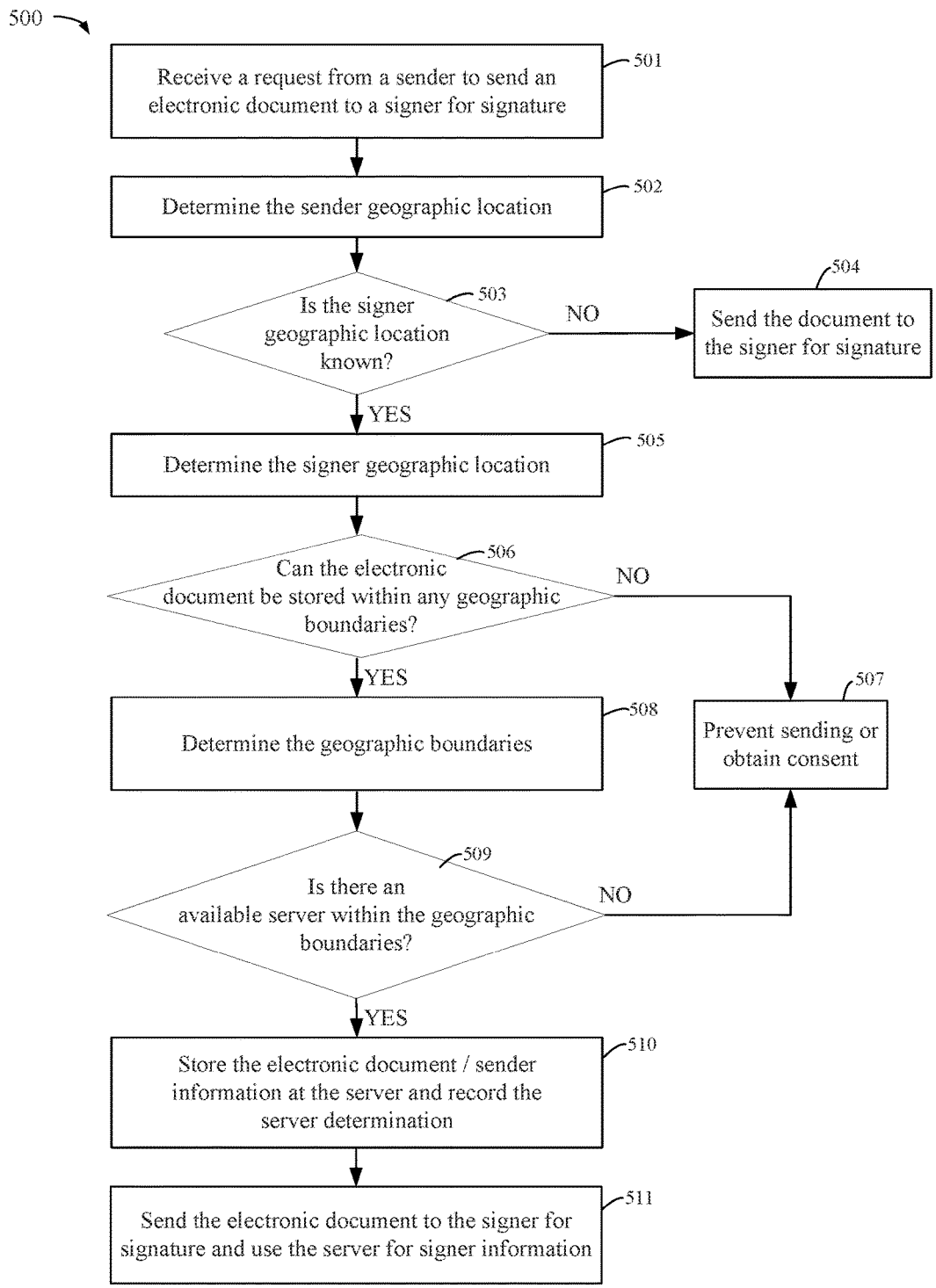
FIG. 5 is a flow chart illustrating another exemplary technique for storing an electronic document during an electronic document signing process

FIG. 5 is a flow chart illustrating another exemplary technique 500 for storing an electronic document during an electronic document signing process. The exemplary technique 500 can be implemented on a user's local computing device, such as on user devices 102A-C, or on a remote computing device, such as on electronic signature server 110 of FIG. 1. However, other devices and configurations can also be implemented. The exemplary technique 500 can be implemented by storing and executing instructions in a non-transitory computer-readable medium. Reference to the technique 500 being performed by a computing device includes the technique 500 being performed by one or more computing devices.

The technique 500 involves receiving a request from a sender to send a document to a signer for signature, as shown in block 501. For example, the sender may use a webpage interface to upload a document for signature, identify a signer e-mail address, and select a send command. The request from the sender may identify multiple signers to sign the electronic document.

The technique 500 determines the sender geographic location as shown in block 502. In one example, the sender geographic location is determined from a user profile for the sender. In another example, the sender geographic location is determined by requesting input from the sender. In another example, the sender geographic location is determined using a geolocation technique that identifies a location of the sender's computing device.

If the sender is sending the electronic document on behalf of a business entity or another person, the geographic location of the business entity or other person can be determined. The contents of the electronic document or other information provided by the sender can be analyzed to automatically detect if the sender is sending the document on behalf of a business entity. The sender can additionally or alternatively be asked to identify whether the electronic document is being sent on behalf of a business entity or another person. If the electronic document is being sent on behalf of a business entity or another person, the sender geographic location is based on the geographic location of that business entity or other person.

In block 503, the technique 500 determines if the signer geographic location is known, as shown in block 503. For example, the geographic location of the signer may be known to the signature service based on the signature service having a user profile record for the signer that identifies the signer geographic location. In another example, the geographic location of the signer is known to the signature service based on the signature service receiving input from the sender identifying the signer geographic location. In another example, the geographic location of the signer is retrieved by accessing a database, analytics system, or other third party information source. If the signer geographic location is not known to the signature service, the document is sent to the signer for signature and a technique such as technique 600 of FIG. 6 can be used to ensure compliance with data storage requirements. If the signer geographic location is known to the signature service, the technique 500 determines the signer geographic location as shown in block 505.

The technique 500 next determines whether the electronic document can be stored within any geographic boundaries, as shown in block 506. In other words, the technique determines whether there is at least one compatible geographic location in which the electronic document can be stored in compliance with data storage requirements. In one example, a compatibility mapping is used to identify if there are any geographic locations and corresponding geographic boundaries within which the electronic document can be stored. If not, the technique 500, proceeds to prevent sending of the electronic document or to obtain consent for sending the electronic document even though storage of the electronic document may violate data storage requirements, as shown in block 507. To prevent the sending of the electronic document, the technique 500 can present a notification to the sender identifying the reason for preventing the sending of the electronic document. The sender may then take an appropriate corrective action. For example, there may be no compatible geographic locations because the signers in set of signers specified for the electronic document are incompatible with one another. As a specific example, a sender in the United States may attempt to send an electronic document for signature by both a signer in the European Union and a signer in Japan and find that there is no compatible geographic locations in which the electronic document can be stored. In this case, the sender can create separate electronic documents for the signers to sign individually rather than collectively. Specifically, the sender may send one electronic document for signature to the signer in the European Union and another electronic document for signature by the signer in Japan. Each of the electronic documents will be stored at a server within different geographic boundaries and thus comply with data storage requirements. The technique 500 can provide a notification that identifies a possible data storage requirement compliance issue and suggests one or more corrective actions that are available to the signer. For example, suggesting that the electronic document be broken into multiple documents and/or suggesting that one or more of the users provide consent to store the electronic document in a particular geographic locations that are compatible given such consent.

The notification of a potential compliance issue may additionally or alternatively include an option for the sender to consent to sending the document for signature even though there is no compatible geographic locations in which the electronic document can be stored. The consent allows the sender to override the requirement. Such an override will be recorded in the permanent audit trail of the contract. The sender may also condition the signer's ability to sign the electronic document on the signer providing consent. In some circumstances, the consent of the sender and/or signer(s) may satisfy the data storage requirement. For example, a country may have a data storage requirement that prevents resident data from being exported outside the country unless the resident provides express consent. The technique 500 may assess a compatibility mapping to identify that consent from one or more of the users will make a compatible geographic locations available. In such a case, the users are notified that the data storage requirement compliance can be achieved if those users consent and the consent of those users is requested.

In other circumstances, a compatible geographic location will not be identified even with consent. The consent of the sender in such circumstances allows the signing process to proceed even though there is a possible data storage requirement compliance issue. The sender is able to knowingly assume the risk of a possible violation. If no compatible geographic location exists and the sender consents to proceed anyway, a geographic location can be selected based on other appropriate criteria. For example, if the sender has provided consent, a geographic location may be selected based on the geographic location being compatible with the other users, e.g., the one or more signers. During the signature process any user can be asked to consent to storage of the electronic document within a particular geographic location. If a user refuses, the contract can be cancelled.

If block 506 determines that the electronic document can be stored within geographic boundaries, i.e., that there is at least one compatible geographic location, the technique 500 determines those geographic boundaries, as shown in block 508. The technique 500 next determines if there is an available server within the geographic boundaries, as shown in block 509. The geographic locations of the servers are determined based on the techniques disclosed herein and used to determine which of the servers are within the geographic boundaries. For example, data received from the servers can provide the geographic locations of the servers and/or identify whether the servers are currently available to store electronic documents.

If there is no available server within the geographic boundaries, the technique 500, proceeds to prevent sending of the electronic document or to obtain consent, as shown in block 507, and described above. If there is at least one available server in the geographic boundaries, the technique 500 stores the electronic document, including sender information, at the server and records the server determination, as shown in block 510. In one example, the sender is from the United States, the signer is from the European Union, and a server is identified in the European Union. The electronic document is stored at this server in the European Union. If multiple servers are available within the geographic boundaries, the technique 500 chooses a server arbitrarily or based on other factors such as server performance, wait times, network latency, etc. The technique 500 stores the electronic document along with a record of determining which server to use. In one example, once the server has been determined, the technique 500 annotates the electronic document and its metadata to reflect the determination of which server to use. Storage of the electronic document and/or associated metadata is restricted to occur only in the given server.

After storing the electronic document at the server and recording the server determination, the technique 500 then sends the electronic document to the signer for signature and uses the server for the signer information, as shown in block 511. The signer geographic location can be confirmed when the signer receives the electronic document for signature. For example, the signer may be asked to provide input to identify his geographic location at the time of signing or the signer geographic location may be automatically determined, for example, using a geolocation technique to locate the signer's computing device.

The compatible geographic locations and associated geographic boundaries can also be used to restrict the communication routes through the network and/or the use of services. For example, the technique 500 may only use European Union mail servers to send the electronic document, notifications, etc. In one example, the electronic document signature service specifies communications that use specific network routers within particular geographic boundaries. The geographic locations of the network routers are determined or tracked. For example, the geographic locations of routers can be retrieved from the domain name system (DNS) on which they are identified. The communication paths that are used for communications with the servers are specified by using an overlay network that provides a logical network on top of the low layer communication network. The communication path is specified using the overlay network to ensure that the routers involved are within specified geographic boundaries. The following is an example of an overlay network that respects geographic locations. From the geographic locations of the routers, a set of viable network paths is computed to the destination. This can be done by standard weighted path traversal algorithms by setting the path cost of any router (or cable) "outside" the geographic boundary to infinity. The set computed is the overlay network and any device in the set can be used. The process can be further refined based on the direction traffic must flow by maintaining a mapping from nodes to other nodes and "can receive" and "can send" tables. Using the devices and network computed, the process computes new routing tables either on the fly, or dynamically in a hop-byhop basis. Using those routing tables, the data is sent to the destination along the determined path within the desired geographic boundaries.

Technique 500 takes the signer geographic location into account in identifying a server for the electronic document early in the signing process. This reduces the chances that the electronic document will need to be migrated to another server at another point in the signing process. If there are multiple signers, the technique 500 determines and uses a server within a geographic location that is compatible with all of the known user geographic locations at various points in the signing process. The technique 500 then migrates the electronic document or cancels the electronic document signing process as necessary based on additional signer geographic locations that are later determined.

Figure 6:
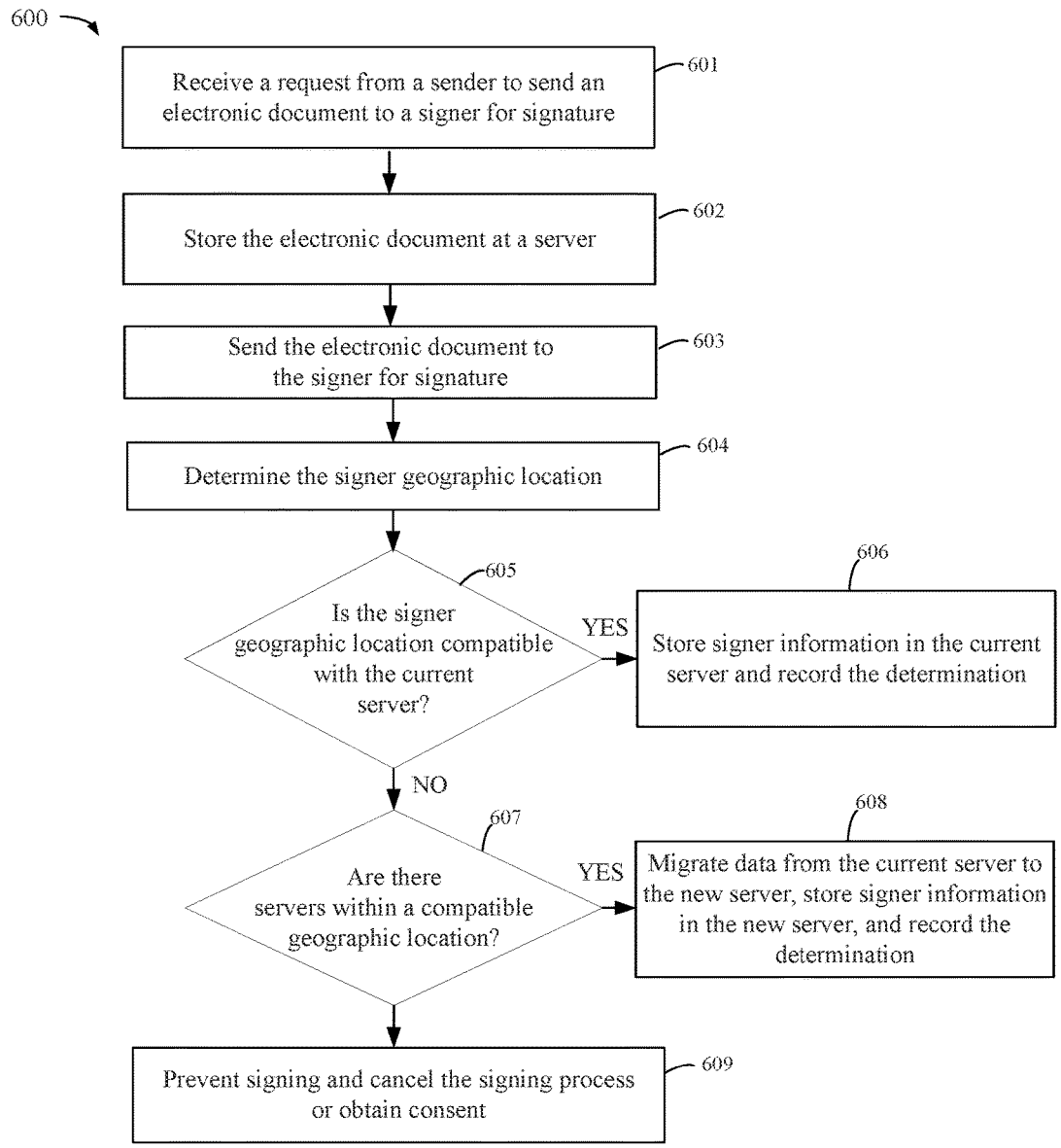
FIG. 6 is a flow chart illustrating an exemplary technique for storing an electronic document during an electronic document signing process in which the signer geographic location is not known before sending the electronic document to the signer for signature.

FIG. 6 is a flow chart illustrating an exemplary technique 600 for storing an electronic document during an electronic document signing process in which a signer geographic location is not known before sending the electronic document to the signer for signature. The exemplary technique 600 can be implemented on a user's local computing device, such as on user devices 102A-C, or on a remote computing device, such as on electronic signature server 110 of FIG. 1. However, other devices and configurations can also be implemented. The exemplary technique 600 can be implemented by storing and executing instructions in a non-transitory computer-readable medium. Reference to the technique 600 being performed by a computing device includes the technique 600 being performed by one or more computing devices.

The technique 600 receives a request from a sender to send an electronic document to a signer for signature, as shown in block 601. For example, the sender may use a webpage interface to upload a document for signature, identify a signer e-mail address, and press a send command. The request from the sender may identify multiple signers to sign the electronic document.

Since the geographic location of the signer is not known, the technique 600 stores the electronic document at a server, as shown in block 602, before sending the document for signature by the signer. If no other signers are involved or no other signer geographic location is known, then the server can be identified in the geographic boundaries of any geographic location that is compatible with the sender geographic location. In one example, the electronic document is stored at a server closest to the sender geographic location. If the geographic locations of one or more, but not all, of the signers are known, the electronic document is stored at a server within geographic boundaries of a geographic location that is compatible with all of known geographic locations of the users.

The technique 600 sends the electronic document to the signer for signature, as shown in block 603, and determines the signer geographic location, as shown in block 604. In one example, the signer geographic location is determined by requesting input from the signer. In another example, the signer geographic location is determined using a geolocation technique that identifies a location of the signer's computing device and the approximate geographic location of the computing device.

If the signer is signing the electronic document on behalf of a business entity or another person, the geographic location of the business entity or other person can be determined. The contents of the signature block or other portion of electronic document, or other information provided by the signer, can be analyzed to automatically detect if the signer is signing the document on behalf of a business entity. The signer can additionally or alternatively be asked to identify whether the electronic document is being signed on behalf of a business entity. If the electronic document is being signed on behalf of a business entity or another person, the signer geographic location is based on the business entity or other person.

Technique 600 determines if the signer geographic location is compatible with the current server, as shown in block 605. In one example, geographic boundaries within which the electronic document must be stored are determined based on the signer geographic location and the technique 600 determines whether the current server is within those geographic boundaries. If the signer geographic location is compatible with the current server, the technique 600 stores signer information in the current server and records the determination that the current server is compatible, as shown in block 606.

Figure 7:
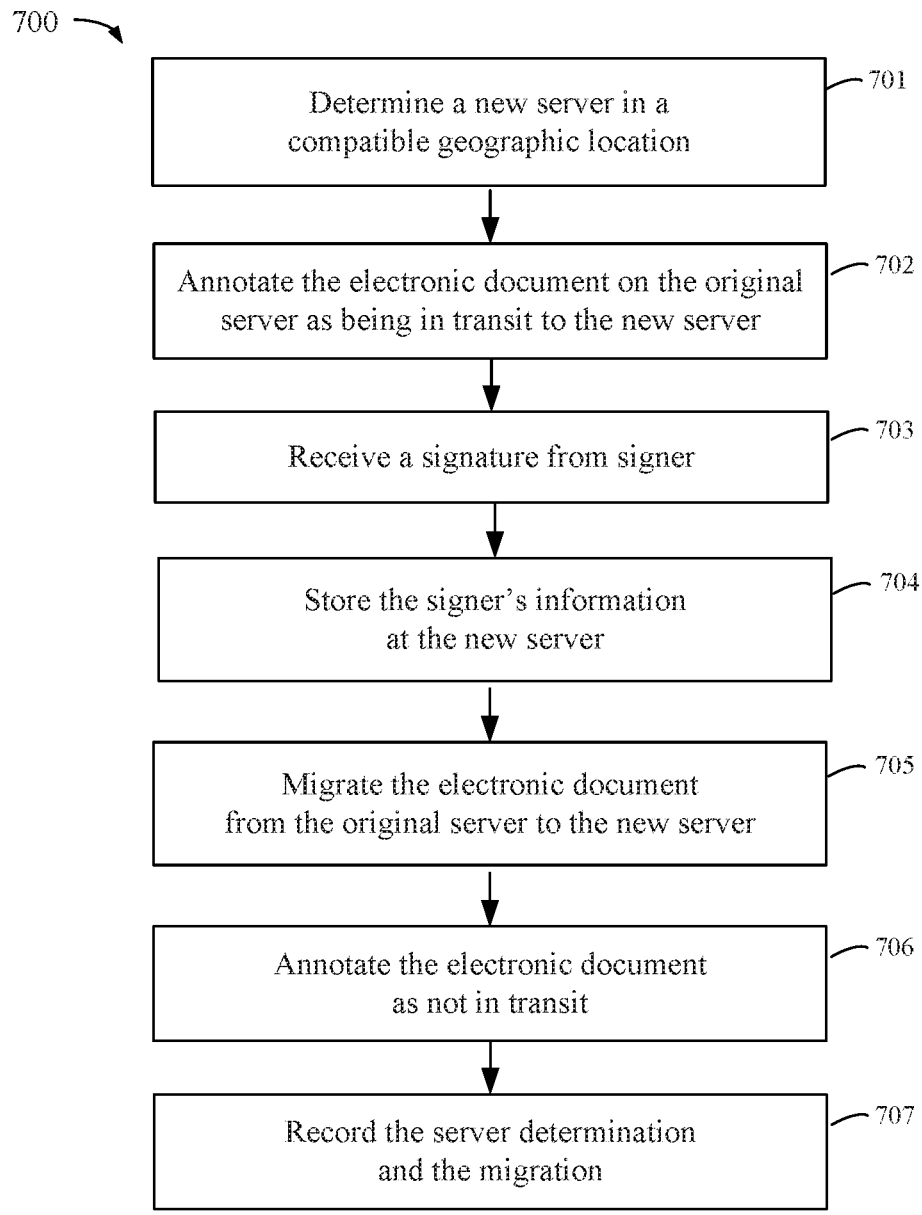
FIG. 7 is a flow chart illustrating an exemplary technique for storing an electronic document at a new server based on a newly-determined signer geographic location.

If the signer geographic location is not compatible with the current server, the technique 600 determines if there are any servers in a compatible geographic location, as shown in block 607. If there is a server in a compatible geographic location, the technique 600 migrates the electronic document and associated data from the current server to the new server, stores the signer information in the new server, and records the determination of the server, as shown in block 608. An exemplary technique 700 for performing the step of block 608 is illustrated in FIG. 7.

If there are no servers in a compatible geographic location as determined by block 607, the technique 600 prevents signing and cancels the signing process or obtains consent, as shown in block 609. A notification can be provided to the sender and/or signer(s) identifying that there is a data storage requirement issue. The notifications can identify one or more corrective actions if such actions are available. The notifications can additionally or alternatively request that the sender and signer(s) provide consent to store the electronic document even though there is a possible data storage requirement issue. As described above, the data storage requirements may allow storage in one or more geographic locations based on consent of the one or more of the users. The consent(s) may result in a compatible geographic location. If not, the consents allow the users to knowingly assume the risk of a possible data storage requirement violation.

If the signing process involves multiple signers, the technique 500 repeats steps 604-609 each time a new signer in an unknown signer geographic location accesses the electronic document to sign the document.

Exemplary Techniques for Migrating an Electronic Document

Techniques disclosed herein migrate an electronic document from one server to another server in various circumstances. The techniques generally involve determining to migrate the electronic document based on a changed condition of a server and/or based on determining a signer geographic location, identifying geographic boundaries for storing the electronic document, identifying the new server within the geographic boundaries, and migrating the electronic document from the original server to the new server. The operations of various exemplary algorithms that can be employed to perform these functions are discussed throughout this specification.

FIG. 7 is a flow chart illustrating an exemplary technique 700 for storing an electronic document in a new server based on a newly-determined signer geographic location. The exemplary technique 700 can be implemented on a user's local computing device, such as on user devices 102A-C, or on a remote computing device, such as on electronic signature server 110 of FIG. 1. However, other devices and configurations can also be implemented. The exemplary technique 700 can be implemented by storing and executing instructions in a non-transitory computer-readable medium. Reference to the technique 700 being performed by a computing device includes the technique 700 being performed by one or more computing devices.

Based on a newly-determined signer geographic location, the technique 700 determines a new server in a compatible geographic location, as shown in block 701. The signer geographic location can be determined based on information provided by the signer and/or based on detecting a location associated with a computing device used by the signer. The server can be determined based on the geographic location of the signer (and other users), the geographic locations of servers, and data storage requirements as previously described. The technique 700 annotates the electronic document as being in transit to the new server, as shown in block 702. The signature from the signer is received, as shown in block 703, and signer information is stored at the new server, as shown in block 704.

The technique 700 also migrates the electronic document to the new server, as shown in block 705. In one example, the migration is accomplished by sending a message to the original server instructing the original server to send the electronic document to the new server. In another example, the migration is accomplished by the signature service requesting the electronic document from the original server and then sending the electronic document to the new server. The signature service can additionally control the communication path of the electronic document from the original server to the new server, for example, by providing network routing instructions for routing the electronic document through routers within particular geographic boundaries.

Once the migration is complete, technique 700 annotates the electronic document as not in transit, as shown in block 706. The server determination and the migration are recorded, as shown in block 707.

The migration of the electronic document to the new server results in storing all of the information for the electronic document in a single server. This reduces the complexity of the system and reduces the potential for inconsistencies and other errors. The electronic document and associated information can be stored in various forms. In one example, the original electronic document uploaded by the sender is stored in a file separate from subsequent additions and metadata. In this example, as the sender adds fields and information to the electronic document, these additions are stored as a series of transformations. Similarly, as a signer adds a signature and other information to the electronic document, these additions are also stored as a series of transformations. Metadata can be stored to identify information about the sender and signer(s). For example, such metadata can store the e-mail addresses, locations, and geographic locations of the users. The metadata can additionally or alternatively store information about the signing process. For example, the metadata can include records of determinations of geographic boundaries, determinations of servers within those geographic boundaries, and the occurrence of data migration performed to ensure data storage requirement compliance. Storing the interactions as a series of interactions and storing metadata recording the determinations and occurrences that occur provides a record of the actions taken by the users during the signing process.

The migration of an electronic document and storage of the signer information can be coordinated so that the signer does not have to wait to complete his signature. Specifically, the signer information is stored at the new server before or while the electronic document is migrated from its current server to its new server. In the example of technique 700, the electronic document is annotated as in-transit in block 702. This allows the signer's information to be stored without waiting for the migration of the electronic document. The in-transit annotation prevents any modification to electronic document made by another user. The signer information, which may be in the form of a series of transformations and metadata is based on the current state of the electronic document. By ensuring that the current state of the document does not change until the migration is complete, the signer information can be stored before the migration is complete. Thus, the storing of the signer's information in the new server shown in block 704 can occur before or during the migration of the electronic document shown in block 705. In this way, the electronic document is migrated without the signer having to wait to complete his signature and data synchronization is assured. The data migration effectively occurs in the background. Once the migration is complete, the electronic document can be deleted from the prior server.

Figure 8:
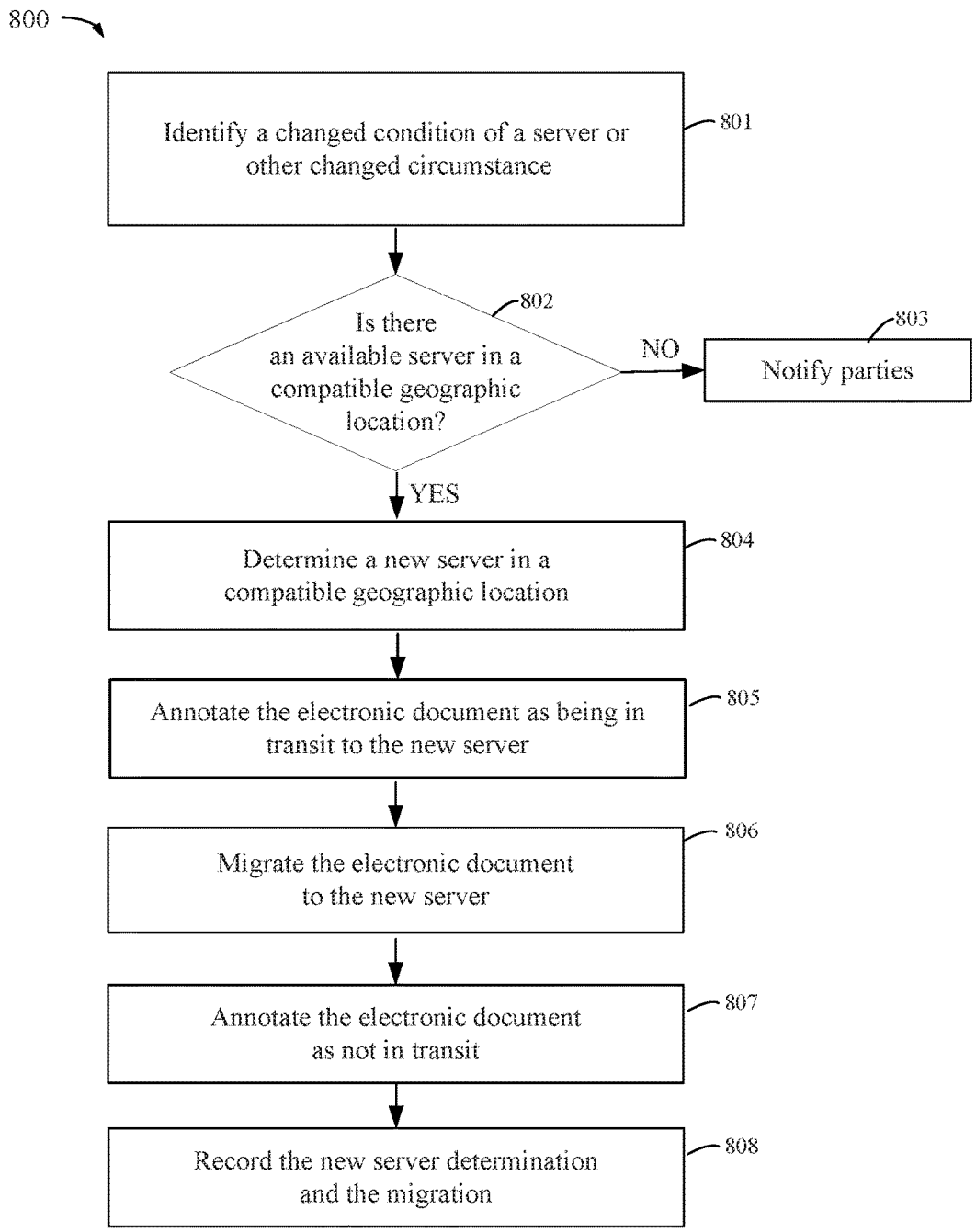
FIG. 8 is a flow chart illustrating an exemplary technique for migrating an electronic document to a new server.

FIG. 8 is a flow chart illustrating an exemplary technique 800 for migrating an electronic document to a new server based on a changed condition of a server or other changed circumstance. The exemplary technique 800 can be implemented on a user's local computing device, such as on user devices 102A-C, or on a remote computing device, such as on electronic signature server 110 of FIG. 1. However, other devices and configurations can also be implemented. The exemplary technique 800 can be implemented by storing and executing instructions in a non-transitory computer-readable medium. Reference to the technique 800 being performed by a computing device includes the technique 800 being performed by one or more computing devices.

Technique 800 identifies a changed condition of a server or other changed circumstance, as shown in block 801. Detecting a changed condition of a server can be achieved using various techniques. In one example, an electronic document signature service receives data from a server that identifies the conditions and/or changes in conditions at the server. Such data can identify the available storage, processing speed, wait times, bandwidth, and other performance attributes of the server. In another example, the signature service periodically sends tests messages to the server and determines the condition of the server based on the responses that are received. For example, the electronic document signature service can determine performance attributes of the server based on the time it takes for the server to respond.

Detecting other changed circumstances can involve monitoring databases and third party information sources for changes, for example, to detect a change of a data storage requirement or a change of user information. In one example, a signer moves to a new residence in a new geographic location and the new residence address is detected in a profile of the account with an electronic document signature service. In another example, a government changes its data storage requirements to include or exclude one or more geographic locations as being compatible for storage of its residents' personal data. The change is detected by monitoring an electronic publication provided by the government. In another example, a server is taken offline for maintenance. The change is detected by monitoring the status of the server.

Based on detecting the changed condition of the server or other changed circumstances, technique 800 determines if there is an available server in a compatible geographic location, as shown in block 802. For example, if the signer geographic location has changed, the technique 800 determines if there are any servers in geographic locations that are compatible with both the sender geographic location and the new signer geographic location. In another example, if a server is taken offline for maintenance, the technique 800 determines if there is another server in a compatible geographic location that can be used.

If there is no available server as determined in block 802, the technique 800 notifies the users, as shown in block 803. The users can be notified of the issue, asked for consent, and/or provided with one or more suggested corrective actions. In certain instances, the electronic document signing process will be cancelled based on an irreconcilable issue. The users can be notified of the cancellation. In other instances, the users may be notified that the electronic document will be unavailable for a period of time. For example, if the current server is taken offline for an hour and no alternative server is available, the users may be notified that the electronic document will be unavailable during that time. Additional notification can be provided when the electronic document is again available when the server is back online.

If there is an available server in a compatible geographic location, technique 800 identifies that server for use in storing the electronic document, as shown in block 804. If multiple servers are available in a compatible storage area, then one of the servers is chosen arbitrarily or based on selection criteria, such as proximity to the current server or the network communication paths required for the migration.

The technique 800 annotates the electronic document as being in transit to the new server, as shown in block 805. The annotation can involve similar features as those described with respect to block 702 of FIG. 7. The annotation prevents modifications to the electronic document at the original server during the migration. The technique 800 migrates the electronic document to the new server, as shown in block 806. The migration can involve similar features as those described with respect to block 705 of FIG. 7. The technique 800 annotates the electronic document as not in transit at the new server, as shown in block 807. The technique 800 records the server determination and migration, as shown in block 808.

Techniques disclosed herein prohibit or restrict modifications to an electronic document during migration. In one embodiment, when a signer provides a signature and/or signer information requiring a data migration, modifications by the sender and any other signers are prohibited while the electronic document is in transit. In other embodiments, the constraint of not allowing modifications to the electronic document is relaxed, allowing the migration to be interrupted and retargeted to a new server. In one example, a third server is determined while the electronic document is being migrated from a first server to a second server. The electronic document is annotated with the third server without overwriting the original in transit annotation that identified the second server. In one example, an "in transit" annotation includes an ordered list of servers identifying two or more servers based on an order of multiple migrations. Unsent data remaining at the first server is sent to the third server. The signer's data stored at the second server (waiting for the rest of the electronic agreement to arrive according to the first migration) is also annotated. For example, an "in migration" annotation can be used to annotate the signer's data. The signer's data and any other data of the electronic document that has already been migrated to the second location is migrated to the third location. The determinations and events involved in the migrations are recorded.

Whenever any of techniques 500, 600, 700, or 800 makes a determination related to data storage requirement compliance, migrates data, or receives consent, the event can be recorded. This recording provides a permanent record that remains with the electronic document and acts as proof that electronic document signature service and the users involves in the signing process have complied with and/or consented to the data sovereignty requirements.

Exemplary Techniques for Controlling Access to Electronic Documents and Information Techniques disclosed herein enable a signature service to use multiple servers that use separate instances of the signature service application (e.g., separate application stacks). Individual users access the signature service through particular servers. For example, a user in New York City, N.Y. may access the signature service via a server that is also in New York City. When the user accesses the signature service, the user's device is directed to the server in New York City. For example, the user's device may be given a uniform resource locator (URL) associated with a webpage user interface provided by the New York City server. The user logs into the signature service using the webpage interface and uses the user interface to access signature service features that are provided by the application stack on the New York City server. The user's profile information and the electronic documents originated by the user are also stored on the New York City server. In addition, all processing of the electronic documents originated by the user occurs on the server. A second user in Germany has similar experiences and interactions with a server in Berlin, Germany. The first user's home server is the New York City server and the second user's home server is the Berlin server. In this example, the different application stacks on the different servers provide parallel features of the signature service.

Embodiments of the invention control access to the electronic documents and information on the various servers to ensure compliance with data storage requirements. For example, a data storage requirement may require that an electronic document, that was originated by the second user and stored on the Berlin server, only be stored in Germany. In this example, the data storage requirements prohibit transferring the electronic document for storage on the New York City server. Techniques of the invention enable the first user to access the electronic document stored on the Berlin server without storing the electronic document on the first user's home server in New York City. In addition, the exemplary data storage requirements prohibit receiving information from the first user for the electronic document, storing the information on the New York City server, and then transferring the information or storage on the Berlin server. Techniques of the invention enable compliance with such data storage requirements by ensuring that information received from the first user for the electronic document is only stored with the electronic document on the Berlin server.

Figure 9:
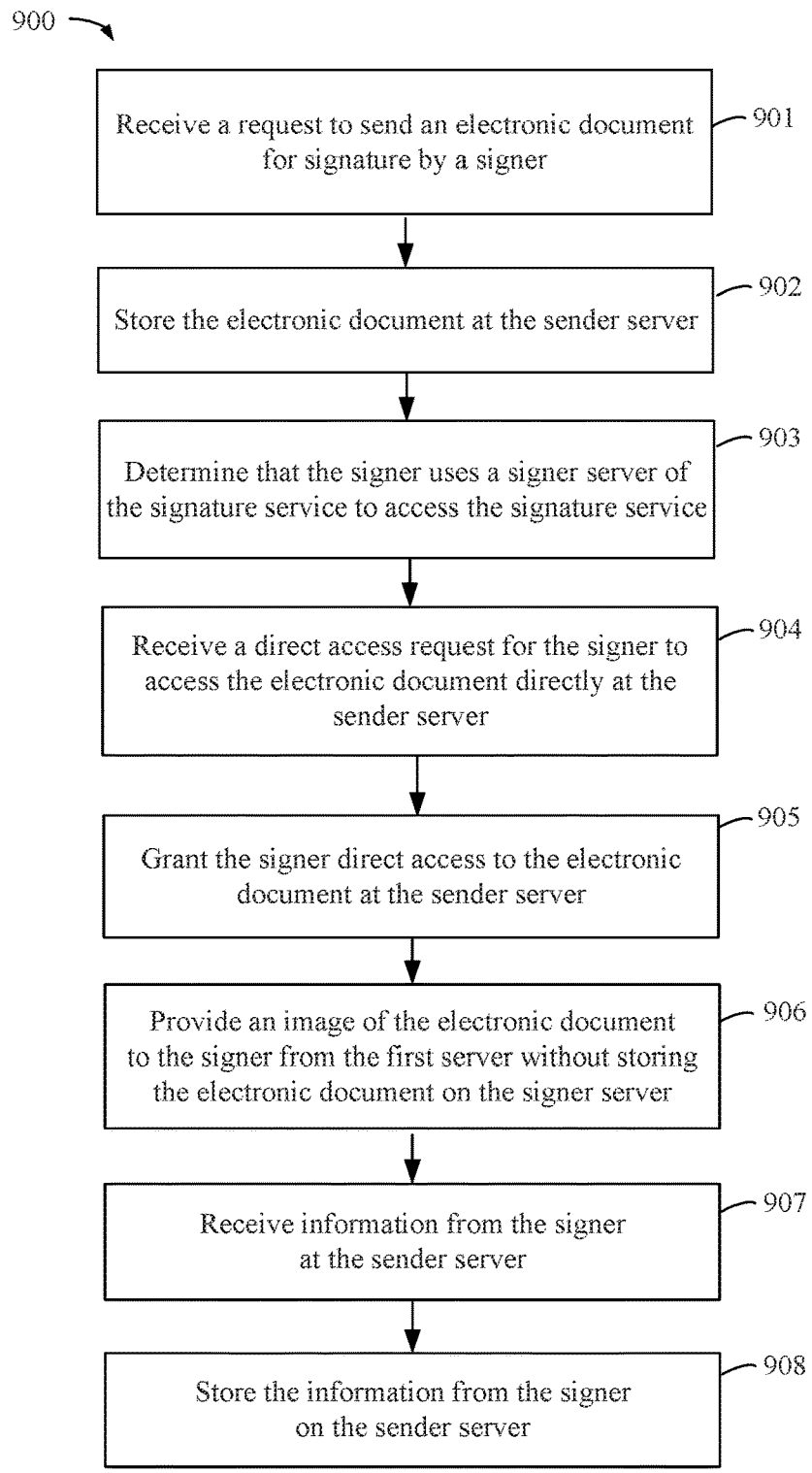
FIG. 9 is a flow chart illustrating an exemplary technique for controlling access to an electronic document during an electronic document signing process.

FIG. 9 is a flow chart illustrating an exemplary technique 900 for controlling access to an electronic document during an electronic document signing process. The exemplary technique 900 can be implemented on a server of multiple servers used to provide a signature service. For example, the exemplary technique 900 can be performed by a sender server that is used by a sender to access the signature service. The exemplary technique 900 can be implemented by storing and executing instructions in a non-transitory computer-readable medium. Reference to the technique 900 being performed by a server includes the technique 900 being performed by one or more computing devices, for example, by one or more computing devices that form a data center.

The technique 900 involves receiving a request to send an electronic document for signature by a signer, as shown in block 901. For example, a sender may use a sender computer to login to the sender's home server, upload a document, identify a signer to sign the document, and select a command to send the electronic document to the signer for signature. The technique 900 stores the electronic document at the sender server, as shown in block 902. In technique 900, electronic documents are only stored on the home server of the user who originated the electronic document. Access to the electronic document is limited to allow signers to view, complete, and/or sign the electronic document without requiring the electronic to be stored on a remote server such as the home server of the signer.

The technique 900 determines that the signer uses a signer server of the signature service to access the signature service, as shown in block 903. In one example, the signature service determines the signer's home server (i.e., the signer server) by accessing a list or dataset that identifies the home server of each user having an account with the signature service. The signer is notified of the electronic document being available for the signer to sign. When the signer on the signer device attempts to access the electronic document to view, complete, and/or sign the electronic document, the signature service coordinates providing access to the electronic document directly from the sender server.

The technique 900 involves receiving a direct access request for the signer to access the electronic document directly at the sender server, as shown in block 904. In one example, the signer, using a signer device, has logged in at the signer server and has thus been authenticated by the signer server. The signer identifies an intention to access the electronic document to the signer server and the signer server sends the direct access request to the sender server. The direct access request in this example includes signer information, such as the signer's e-mail address and/or name. In one example, the signer information in the direct access request is limited based on a data storage requirement. For example, the signer information in the direct access request will not include the signer's credit card number from the signer's user profile if a data storage requirement prohibits storing that information outside of the geographic area of the signer server.

The technique 900 further involves granting the signer direct access to the electronic document at the sender server, as shown in block 905. In on example, the signer is federated to the sender server based on having been authenticated by the signer server. For example, the sender server may send a request for the signer server to confirm that the signer has been authenticated by the signer server and grant access based on receiving confirmation. The grant of access to the electronic document is also based on the information about the signer, such as the signer's e-mail address and/or the signer's name. The sender server, for example, can use signer information to grant access. For example, if the sender identified that the electronic document should be sent to a signer having a particular e-mail address for signature, the sender server can confirm that the user being granted access has the same e-mail address.

The technique 900 further involves sending a communication with an image of the electronic document from the sender server to the signer device, as shown in block 906.

The "image" of the electronic document can include a representation of the electronic document in any format that can be viewed on the signer device. Exemplary formats include, but are not limited to, JPEG, BMP, and PDF formats. The direct communication allows the signer, on the signer device, to view, complete, and/or sign the electronic document without the electronic document being stored on the signer server. The technique 900 receives input from the signer at the sender server, as shown in block 907. For example, the signer may view the image of the electronic document on a web browser on the signer device with fields overlying portions of the image for the signer to complete. The signer may add a name, date, signature, and/or other information to complete such fields and select a command on the web page user interface to complete the signature process. In response, the information provided by the signer on the signer device is sent directly to the sender server without being stored on the signer server.

The technique 900 further involves storing the signed electronic document on the sender server, as shown in block 908. In one example, the information from the signer is stored as part of the electronic document. In another example, the information from the singer is stored separately from the electronic document and associated with the electronic document. In this example, when the electronic document is displayed or printed, the information from the signer is overlaid on top of the image of the electronic document.

Figure 10:
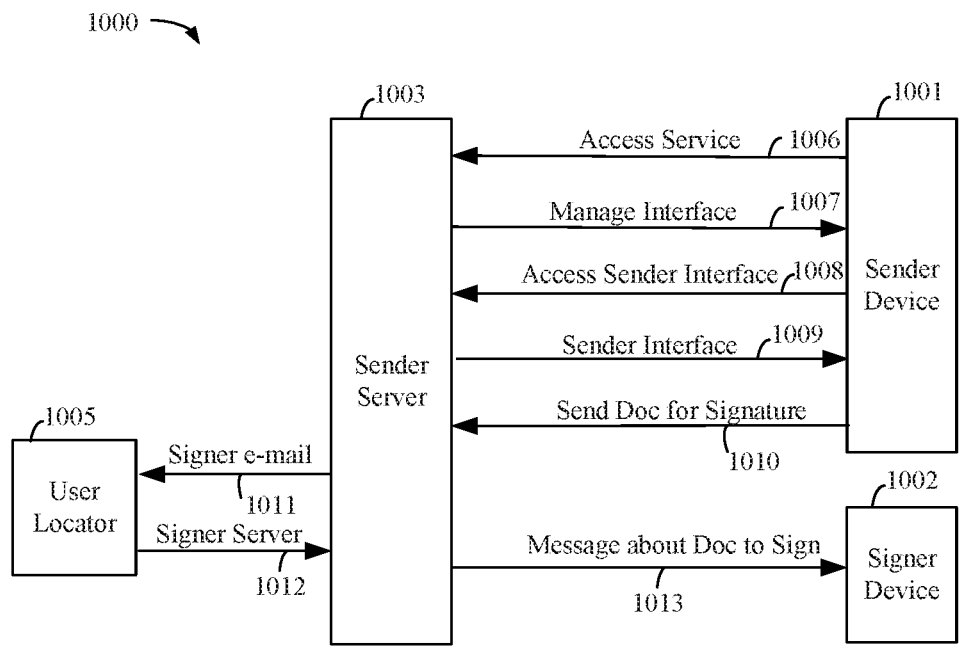
FIG. 10 is a block diagram illustrating an exemplary flow of information during an electronic document signing process.

FIG. 10 is a block diagram illustrating an exemplary flow 1000 of information during an electronic document signing process. In this example, a sender uses sender device 1001 to access a signature service to send an electronic document for signature by a signer using a signer device 1002. The sender device 1001 sends an access service message 1006 to the sender server 1003 to initiate access with the signature service. The access service message 1006 can include login credentials that the sender server 1003 uses to authenticate the sender. In response to the access service message 1006, the sender server 1003 sends a manage interface 1007 to the sender device 1001. In one example, the manage interface 1007 is a web page (e.g., HTML, etc.) that provides a user interface on a web browser on the sender device 1001. The sender uses the user interface to access functions provided by the signature service. In one example, the user interface allows the sender to view a list of electronic documents associated with the sender and view the information in the sender's profile.

The user interface also allows the sender to originate an electronic document for signature by the signer. The sender selects a command to access a sender interface for creating and sending electronic documents for signature. In response, the sender device 1001 sends an access sender interface message 1008 to the sender server 1003 requesting the sender interface. In response, the sender server 1003 sends the sender interface 1009 back to the sender device 1001. In one example, the sender interface 1009 is a web page (e.g., HTML, etc.) that provides a user interface on a web browser on the sender device. The user interface, in this example, allows the user to identify one or more signers for example by providing names and/or e-mail addresses for the signers. The user interface also allows the sender to upload and/or create the electronic document. In one example, the sender drags a local electronic document from local storage on the sender device 1001 onto the webpage to identify the electronic document. The user interface can additionally allow one or more locations to overlay fields on the electronic document. For example, the sender may position a first rectangular field identifying a location for a signature by a signer and a second rectangular field for the signer to enter his credit card number. The user interface in this example also includes a button or other command that, when selected, initiates sending the electronic document to the signer for signature. When the command is selected, the sender device 1001 sends a send doc for signature message 1010 to the sender server 1003. The electronic document is then stored on the sender server 1003.

In the exemplary flow 1001, the sender server 1003 responds to the send doc for signature message 1010 by determining the signer's home server. Specifically, the sender server 1003 sends the signer's e-mail address (and/or other information uniquely identifying the signer) to a user locator 1005. The user locator 1005 maintains a list or other data set that identifies the home servers associated with each of the users of the signature service. The user locator 1005 returns the identity of the signer server 1012 to the sender server 1003 identifying the signer's home server. The sender server 1003 then sends a message about the electronic document for signature 1013 to the signer device 1002. In one example, the message about the electronic document for signature 1013 is sent directly to the signer's e-mail address from the sender server. In another example, the message about the electronic document for signature 1013 is provided indirectly via the signer's home server.

Figure 11:
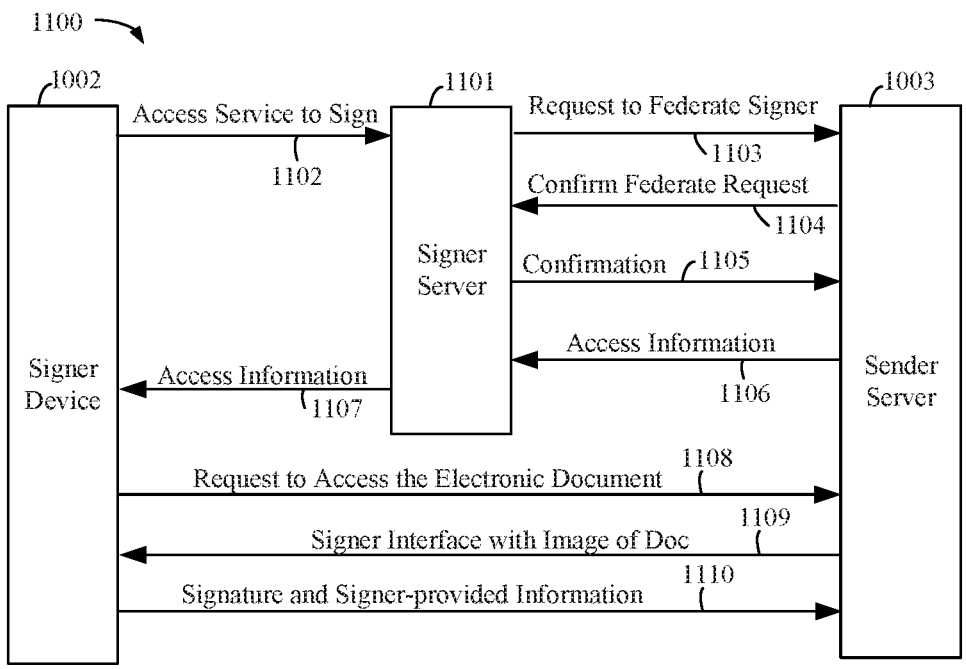
FIG. 11 is a block diagram illustrating another exemplary flow of information during an electronic document signing process.

FIG. 11 is a block diagram illustrating another exemplary flow of information during an electronic document signing process. FIG. 11 provides an example of a flow of information that could follow the information flow of FIG. 10 or any other information flow in which a signer becomes aware of an electronic document for signature that is not stored on the signer server 1101.

In FIG. 11, the signer uses a signer device 1002 to access the signature service by accessing signer server 1101 for the purpose of signing the electronic document. In one example, the signer receives an e-mail notifying the signer that there is an electronic document for the signer to sign and providing a link for the signer to access the electronic document. When the signer selects such a link or otherwise initiates accessing the electronic for signature, the signer device 1002 sends an access service to sign message 1102 to the signer server 1101. In one example, the access service to sign message 1102 includes login credential that the signer server 1101 uses to authenticate the signer. The access service to sign message 1102 also identifies the electronic document to be signed. In response to the access service to sign message 1102, the signer server 1101 identifies where the electronic document is stored based on a pointer associated with the electronic document. The pointer can be received in the access service to sign message 1102 or identified in the signer's information maintained by the signer server 1101.

The signer server 1101 next initiates a process to obtain direct access for the signer to the sender server 1003. The signer server 1101 sends a request to federate the signer 1103 to the sender server 1003, asking the sender server 1003 to grant the signer limited access to the sender server 1003 to access the electronic document. In response, the sender server 1003 sends a confirm federate request message 1104, asking the signer server 1101 to confirm the request to federate the signer. The signer server 1101 responds with confirmation 1105 confirming the request. Through the confirmation process of messages 1104, 1105 the sender server 1003 confirms that the signer is an authorized user of the signature service who has been authenticated by the signer server 1101.

The signer is federated on the sender server 1003 and granted direct access to the sender server for the purpose of accessing the electronic document on the sender server 1003. The sender server 1003 provide access information 1106 to the signer server 1101 and the signer server 1101 provides the access information 1107 to the signer device 1002. The access information 1106, 1107 allows the signer direct access to the electronic document. In one example, the access information 1106, 1107 includes a uniform resource locator (URL) of a web page provided from the sender server 1003 that can be used to access the electronic document.

The signer device 1002 uses the access information 1107 to send a request to access the electronic document 1108 directly to the sender server 1003. In one example, the signer simply accesses a web page identified by a provided URL to request access to the electronic document. The sender server 1003 responds by providing a signer interface with an image of the electronic document 1109. In one example, the signer interface is a webpage that displays the image of the electronic document and prompts the signer to provide a signature and/or information to complete fields overlain on the electronic document. After the signer completes the fields, the signer device 1002 sends the signature and signer-provided information 1110 to the sender server 1003. The sender server 1003 stores the signature and/or signer provided information with the electronic document on the sender server 1003.

In the electronic document signing process illustrated by the information flows of FIGS. 10 and 11, the electronic document is only stored on the sender server 1003. The electronic document is not transferred to and/or stored on the signer server 1101. In addition, information provided by the signer for the electronic document is similarly only stored on the sender server 1003. The information is not transferred to and/or stored on the signer server 1101. Accordingly, the illustrative electronic document signing process complies with data storage requirements that prohibit transferring an electronic document and/or user information from one server to another server. For example, the illustrative process complies with data sovereignty requirements that prevent electronic documents and user information stored on a server in one geographic location (e.g., Germany) from being stored on a server in another geographic location (e.g., anywhere outside of Europe).

Figure 12:
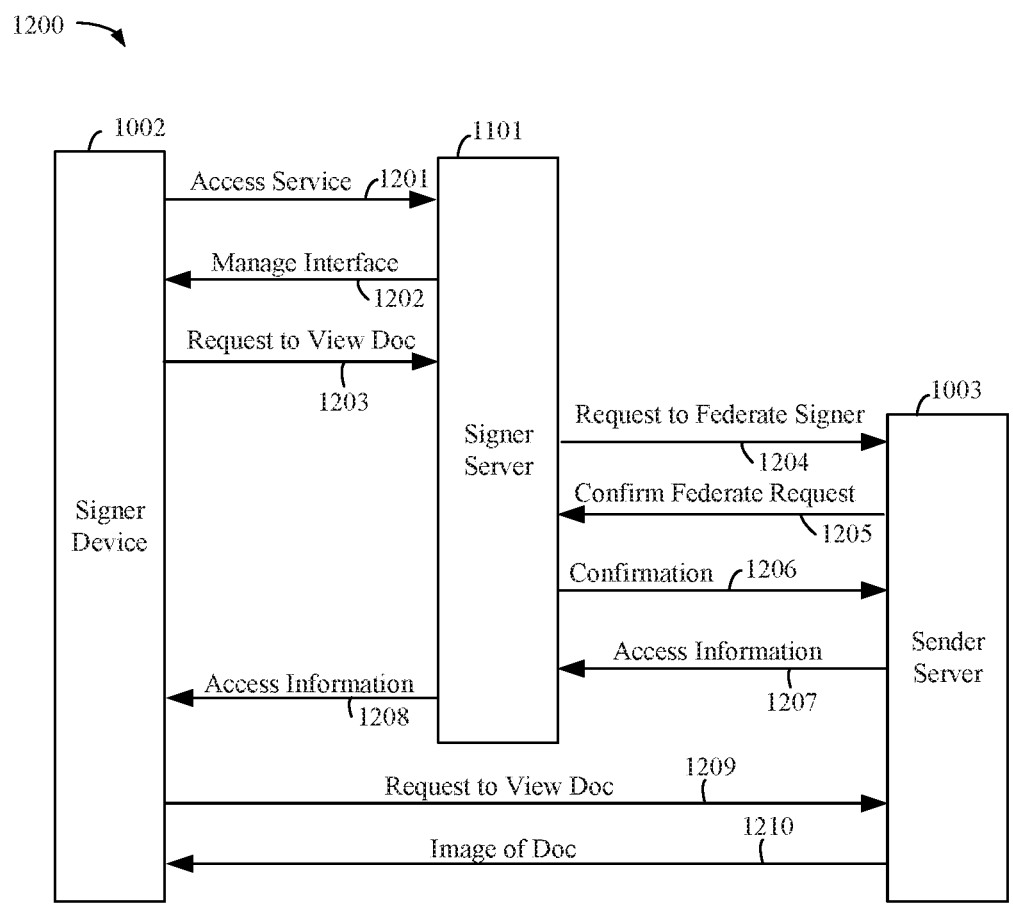
FIG. 12 is a block diagram illustrating an exemplary flow of information enabling a user to view an electronic document stored on a server other than the user's home server.

FIG. 12 is a block diagram illustrating an exemplary flow 1200 of information enabling a user to view an electronic document stored on a server other than the user's home server. FIG. 12 provides an example of a flow 1200 of information that could follow the information flow of FIGS. 10 and 11 or any other information flow in which a signer accesses an electronic document on a server other than the signer server 1101. In FIG. 12, the signer uses a signer device 1002 to access the signature service by accessing signer server 1101. The signer device 1102 sends an access service message 1201 to the signer server 1101 to initiate access with the signature service. The access service message 1201 can include login credential that the signer server 1101 uses to authenticate the signer. In response to the access service message 1201, the signer server 1101 sends a manage interface 1202 to the signer device 1002. In one example, the manage interface 1202 is a web page (e.g., HTML, etc.) that provides a user interface on a web browser on the signer device 1002. The signer uses the user interface to access functions provided by the signature service. In one example, the user interface allows the signer to view a list of electronic documents associated with the signer and view the information in the sender's profile, etc. If the signer accesses an electronic document on the signer server 1101, access to the electronic document is provided by the signer server 1101.

In the example of FIG. 12, the signer selects to view an electronic document that is stored on the sender server 1003. The signer device 1002 sends a request to view the electronic document 1203 to the signer server 1101. The signer server 1101 initiates a process to obtain direct access for the signer to the sender server 1003. The signer server 1101 sends a request to federate the signer 1204 to the sender server 1003 asking the sender server 1003 to grant the signer limited access to the sender server 1003 to access the electronic document. In response, the sender server 1003 sends a confirm federate request message 1205 asking the signer server 1101 to confirm the request to federate the signer. The signer server 1101 responds with confirmation 1206 confirming the request. Through the confirmation process of messages 1205, 1206 the sender server 1003 confirms that the signer is an authorized user of the signature service who has been authenticated by the signer server 1101.

The signer is federated on the sender server 1003 and granted direct access to the sender server 1003 for the purpose of accessing the electronic document on the sender server 1003. The sender server 1003 provide access information 1207 to the signer server 1101 and the signer server 1101 provides the access information 1208 to the signer device 1002. The access information 1207, 1208 allows the signer direct access to the electronic document. In one example, the access information 1207, 1208 includes a uniform resource locator (URL) of a web page provided from the sender server 1003 that can be used to access the electronic document.

The signer device 1002 uses the access information 1208 send a request to view the electronic document directly to the sender server 1003. In one example, the signer simply accesses a web page identified by a provided URL to request access to the electronic document. The sender server 1003 responds by providing an image of the electronic document 1210. In one example, the signer interface is a webpage that displays the image of the electronic document. After the signer device 1002 discontinues viewing of the electronic document, the sender server 1003 communicates with the signer server 1101 to un-federate the signer.

In one exemplary embodiment, an electronic document signature service uses a system for providing access to the electronic documents that it stores for its users. The system includes a plurality of servers, such as servers 1003, 1101 of FIGS. 10-12, that each have instances of an application. Each instance of the application (e.g., each application stack) provides access to the signature service to particular users. Specifically, the users are individually associated with home application stacks on home servers that are used to individually authenticate the users.

The system also provides user interfaces that enable individual users to originate electronic documents for signature, sign electronic documents, and manage electronic documents. In one example, the system provides an interface for managing the electronic documents associated with a user that displays a list of the set of the electronic documents that are associated with the user. For example, the set of electronic documents associated with a user can include all of the electronic documents that the user has originated and/or signed using the electronic document signature service. The electronic documents associated with a user that are not stored on a home server of the user are identified based on pointers stored on the home server of the user. For example, a user profile may include a list of electronic documents associated with the user. In one example, the user profile identifies electronic documents on the user's home server and includes pointers that identify the electronic documents associated with the user that are stored on remote servers and/or the storage locations or addresses of those electronic documents.

An exemplary system includes a user interface means for providing user interfaces that identify sets of electronic documents that are associated with the individual users. The user interface means generally includes instructions stored on a non-transitory computer-readable medium that, when executed by a processor, perform various operations to provide the user interfaces. For example, instances of a signature service application may execute or otherwise use such instructions to provide user interfaces on user devices. For example, an application on a server may execute the instructions to create and/or provide one or more files, such as HTML files or executable application files, that specify the appearance of the user interface. One or more of the files may be sent from a server of the signature service for use on a user device by a user. Similarly, the application on the server may execute the instructions to respond to communications from the devices. For example, when a user selects a command on a webpage on the user's device, the user's device may send a communication identifying the command to the server and the server may execute the instructions to respond with another webpage of the user interface for display on the user device.

One exemplary technique for identifying sets of electronic document involves identifying electronic documents on the home servers and identifying electronic documents on remote servers. In one exemplary technique, each home server maintains a list of all the electronic documents associated with its users. The set of electronic documents is identified by querying this list for all of the electronic documents associated with a particular user. Another exemplary technique maintains a list of each user's electronic documents in a user profile of the respective user. In this example, the set of electronic documents is identified by accessing the user's profile and retrieving the list. In one exemplary technique, the user interface means are configured to use pointers on the home servers in a list of electronic documents to identify the subsets of the electronic documents. In one example, each pointer identifies a remote server on which a corresponding electronic document is stored. In another example, each pointer identifies a unique number that identifies the electronic document, and the server uses the unique number to lookup the location of the electronic document using a remote location service. In another example, each pointer identifies the sender associated with the electronic document and the server uses the sender identity to lookup the location of the electronic document based on the system, in this example, always storing its electronic document on the sender server.

The exemplary system also includes an access means for providing user devices access to sets of the electronic documents. Each user is able to access all of the electronic documents that the user has participated in regardless of whether the electronic documents are stored on the user's home server or on a remote server. The access means generally includes instructions stored on a non-transitory computer-readable medium that, when executed by a processor, perform various operations to provide the user devices access to the sets of the electronic documents. For example, instances of a signature service application may execute or otherwise use such instructions to determine that a user from another home server is an authorized user of the signature service and, based on that determination, grant the user limited access to the electronic document. In one example, the access means grants access to the electronic document based on communications between servers of the signature service. For example, access can be granted by a sender server (that stores the electronic document) based on communications with a signer's home server. Non-limiting examples of such communications are illustrated in FIGS. 11-12.

In one example, the communications between the user's home server and a remote server are used to federate the user to the remote server. The user can be federated based on limited information about the user. For example, the user's home server may provide a limited subset of user profile information stored on the home server to the remote server. The limited of subset of user profile information is selected to comply with a data storage requirement. For example, if a data storage requirement restricts the sending of a credit card number stored at the home server to the remote server, user's credit card number in the user's profile is not included in the information that is sent to remote server to federate the user.

Once federated on the remote server, the remote server grants the user direct access to electronic documents associated with the user on the remote server. In one example, the remote server provides direct access to an electronic document by providing a uniform resource locator (URL). The URL provides direct access to the electronic document from a computing device of the user without storing the electronic document on the home server of the user. For example, the URL may identify a network location of a custom webpage that is generated to include an image of the electronic document. A browser of the user's device uses the URL to receive the webpage and display the electronic document.

The illustrative system is configured to ensure compliance with data storage requirements by controlling access to electronic documents and user information on servers in different geographic locations. One exemplary use case of such a system relates to ensuring compliance with data sovereignty laws that require data to be stored in particular geographic locations. For example, a German data sovereignty law may prohibit user personal identifiable information (PII) that is stored on a server in Germany from being stored on any server outside of Europe. PII includes information that enables a user to be associated with an identity, such as a name, e-mail address, credit card number, social security number, etc. The system enables a signature process between a sender in Germany and a signer in the United States by ensuring that the electronic document originated by the German sender is only stored on a server in Germany. To do so, the system enables the U.S. signer to view and provide information for the electronic document without ever storing the electronic document or the information from the signer on a U.S. server. This is achieved by granting the signer direct access to the German server and signature service application on the server, for example, by temporarily federating the U.S. user from the U.S. server to the German server. When the U.S. signer is done signing the electronic document, he is un-federated back to United States server and a breadcrumb, record, or other pointer is added to his home server identifying that the signer signed an electronic document accessible from the particular remote server on which it is stored. If the signer later selects to view or otherwise access the electronic document, the system again federates the signer to the remote server to again enable direct access to the electronic document.

The system provides a unified user experience in which the user is unaware of the different servers providing the different processing and storage functions. A user logs into the server and accesses a particular instance of the application that provides the signature service on the user's home server. Different users will access different home servers, for example, by being directed to particular URLs based on each user's home server. The user views a user interface that provides access to all of the user's electronic documents regardless of where the electronic documents are stored. In one example, the user interface displays a list of all the electronic documents that the user is associated with. When the user selects to view an electronic document that is not on the user's home server, the system grants the user direct access to the document without the user having to manually login to the other server. Rather, the home server requests access for the user on the remote server in the background, for example, by federating the user on the remote server. The remote server than provides access to the electronic document. In one example, the remote server provides a URL that directly accesses the electronic document from the remote server. Thus, from the user's perspective, the user selects to view the electronic document (e.g., by clicking on the document in a list on the user interface) and the user's device is automatically directed to a URL that accesses the electronic document on the remote server. The user experience (clicking on and then viewing the electronic document) is the same for both electronic documents on the user's home server and electronic documents on remote servers.

Exemplary Computing Environment

Figure 13:
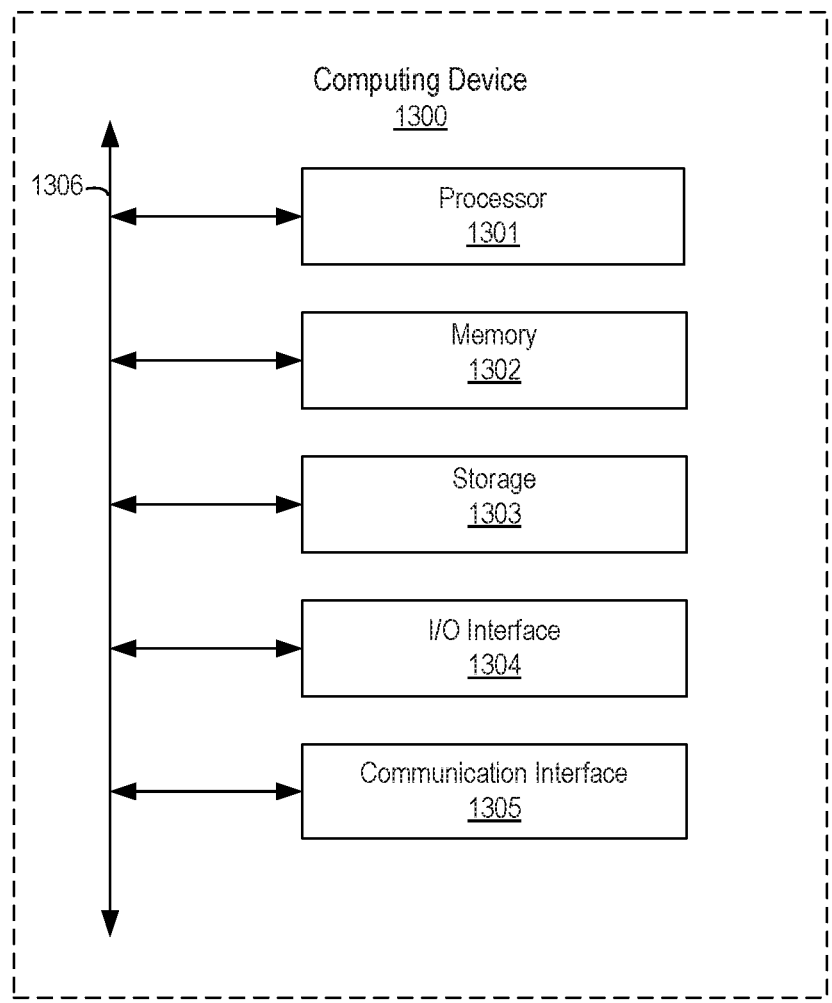
FIG. 13 is a block diagram depicting an example hardware implementation.

Any suitable computing system or group of computing systems can be used to implement the techniques and methods disclosed herein. For example, FIG. 13 is a block diagram depicting examples of implementations of such components. The computing device 1300 can include a processor 1301 that is communicatively coupled to a memory 1302 and that executes computer-executable program code and/or accesses information stored in memory 1302 or storage 1303. The processor 1301 may comprise a microprocessor, an application-specific integrated circuit ("ASIC"), a state machine, or other processing device. The processor 1301 can include one processing device or more than one processing device. Such a processor can include or may be in communication with a computer-readable medium storing instructions that, when executed by the processor 1301, cause the processor to perform the operations described herein.

The memory 1302 and storage 1303 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1300 may also comprise a number of external or internal devices such as input or output devices. For example, the computing device is shown with an input/output ("I/O") interface 1304 that can receive input from input devices or provide output to output devices. A communication interface 1305 may also be included in the computing device 1300 and can include any device or group of devices suitable for establishing a wired or wireless data connection to one or more data networks. Non-limiting examples of the communication interface 1305 include an Ethernet network adapter, a modem, and/or the like. The computing device 1300 can transmit messages as electronic or optical signals via the communication interface 1305. A bus 1306 can also be included to communicatively couple one or more components of the computing device 1300.

The computing device 1300 can execute program code that configures the processor 1301 to perform one or more of the operations described above. The program code can include one or more modules. The program code may be resident in the memory 1302, storage 1303, or any suitable computer-readable medium and may be executed by the processor 1301 or any other suitable processor. In some embodiments, modules can be resident in the memory 1302. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for storing an electronic document during an electronic document signing process, the electronic document signing process comprising a sender sending the electronic document for signature by a signer and the signer signing the electronic document, the method comprising:
   receiving data sent from servers capable of storing the electronic document, the data comprising geographic location identifiers identifying geographic locations of the servers;
   verifying the geographic locations of the servers based on geographic locations associated with Internet Protocol (IP) addresses of network locations from which the data was sent;
   determining a sender geographic location of the sender and a signer geographic location of the signer in the electronic document signing process;
   identifying geographic boundaries for storing the electronic document based on the sender geographic location, the signer geographic location, and data storage requirements applicable to storing the electronic document;
   identifying a server within the geographic boundaries for storing the electronic document based on the geographic locations of the servers; and
   storing the electronic document at the server during the electronic document signing process, wherein storing the electronic document comprises storing sender information and signer information at the server.

2. The method of claim 1, wherein verifying the geographic locations of the servers comprises:
   determining the geographic locations associated with IP addresses based on geographic locations of Internet Service Providers (ISPs) used by the servers to send the data; and
   verifying that the geographic locations of the servers are within a predetermined distance of the geographic locations associated with the IP addresses.

3. The method of claim 1, wherein identifying the server further comprising identifying the server based on performance capabilities of the servers, the performance capabilities of the servers determined based on the data received from the servers.

4. The method of claim 3, wherein identifying the server based on performance capabilities comprises identifying the server based on response times, available storage, or bandwidth of the servers.

5. The method of claim 1,
   wherein determining the signer geographic location comprises determining the signer geographic location prior to sending the electronic document for signature by the signer based on a profile of the signer or input from the sender, and wherein storing the electronic document comprises storing the electronic document at the server prior to sending the electronic document for signature by the signer.

6. The method of claim 1, wherein storing the electronic document at the server comprises migrating the electronic document from a current server to the server based on determining the signer geographic location, determining that the current server is incompatible based on the data storage requirements, or detecting a server condition.

7. The method of claim 6, wherein migrating the electronic document comprises annotating the electronic document at the current server to indicate that the electronic document is in transit.

8. The method of claim 1, wherein storing the electronic document comprises sending the electronic document in data packets to the server, the data packets comprising routing instructions routing the data packets using only routers within the geographic boundaries.

9. A computer program product for storing an electronic document during an electronic document signing process, the electronic document signing process comprising a sender sending the electronic document for signature by a signer and the signer signing the electronic document, the computer program product being tangibly embodied on a non-transitory computer-readable storage medium and comprising instructions that, when executed by at least one computing device, are configured to cause the at least one computing device to:

receive data sent from servers capable of storing the electronic document, the data comprising geographic location identifiers identifying geographic locations of the servers;

verify the geographic locations of the servers based on geographic locations associated with Internet Protocol (IP) addresses of network locations from which the data was sent;

determine a sender geographic location of the sender and a signer geographic location of the signer in the electronic document signing process;

identify geographic boundaries for storing the electronic document based on the sender geographic location, the signer geographic location, and data storage requirements applicable to storing the electronic document;

identify a server within the geographic boundaries for storing the electronic document based on the geographic locations of the servers; and store the electronic document at the server during the electronic document signing process, wherein storing the electronic document comprises storing sender information and signer information at the server.

10. The computer program product of claim 9, wherein the instructions that cause the at least one computing device to verify the geographic locations of the servers comprise instructions that, when executed, are configured to cause the at least one computing device to:

determine the geographic locations associated with IP addresses based on geographic locations of Internet Service Providers (ISPs) used by the servers to send the data; and verify that the geographic locations of the servers are within a predetermined distance of the geographic locations associated with the IP addresses.

11. The computer program product of claim 9, wherein the instructions that cause the at least one computing device to identify the server further comprise instructions that, when executed, cause the at least one computing device to identify the server based on performance capabilities of the servers, the performance capabilities of the servers determined based on the data received from the servers.

12. The computer program product of claim 11, wherein the instructions that cause the at least one computing device to identify the server based on performance capabilities comprise instructions that, when executed, cause the at least one computing device to identify the server based on response times, available storage, or bandwidth of the servers.

13. The computer program product of claim 9, wherein the instructions that cause the at least one computing device to determine the signer geographic location comprise instructions that, when executed, cause the at least one computing device to determine the signer geographic location prior to sending the electronic document for signature by the signer based on a profile of the signer or input from the sender, and wherein the instructions that cause the at least one computing device to store the electronic document comprise instructions that, when executed, cause the at least one computing device to store the electronic document at the server prior to sending the electronic document for signature by the signer.

14. The computer program product of claim 9, wherein the instructions that cause the at least one computing device to store the electronic document at the server comprise instructions that, when executed, cause the at least one computing device to migrate the electronic document from a current server to the server based on determining the signer geographic location, determining that the current server is incompatible based on the data storage requirements, or detecting a server condition.

15. The computer program product of claim 14, wherein the instructions that cause the at least one computing device to migrate the electronic document comprise instructions that, when executed, cause the at least one computing device to annotate the electronic document at the current server to indicate that the electronic document is in transit.

16. The computer program product of claim 9, wherein the instructions that cause the at least one computing device to store the electronic document comprise instructions that, when executed, cause the at least one computing device to send the electronic document in data packets to the server, the data packets comprising routing instructions routing the data packets using only routers within the geographic boundaries.

17. A system for storing an electronic document during an electronic document signing process, the electronic document signing process comprising a sender sending the electronic document for signature by a signer and the signer signing the electronic document, the system comprising:

at least one memory including instructions; and at least one processor that is operably coupled to the at least one memory and that is arranged and configured to execute the instructions that, when executed, cause the at least one processor to:

receive data sent from servers capable of storing the electronic document, the data comprising geographic location identifiers identifying geographic locations of the servers;

verify the geographic locations of the servers based on geographic locations associated with Internet Protocol (IP) addresses of network locations from which the data was sent;

determine a sender geographic location of the sender and a signer geographic location of the signer in the electronic document signing process;

identify geographic boundaries for storing the electronic document based on the sender geographic location, the signer geographic location, and data storage requirements applicable to storing the electronic document;

identify a server within the geographic boundaries for storing the electronic document based on the geographic locations of the servers; and store the electronic document at the server during the electronic document signing process, wherein storing the electronic document comprises storing sender information and signer information at the server.

18. The system of claim 17, wherein the instructions that cause the at least one processor to verify the geographic locations of the servers comprise instructions that, when executed, are configured to cause the at least one processor to:

determine the geographic locations associated with IP addresses based on geographic locations of Internet Service Providers (ISPs) used by the servers to send the data; and verify that the geographic locations of the servers are within a predetermined distance of the geographic locations associated with the IP addresses.

19. The system of claim 17, wherein the instructions that cause the at least one processor to identify the server further comprise instructions that, when executed, cause the at least one processor to identify the server based on performance capabilities of the servers, the performance capabilities of the servers determined based on the data received from the servers.

20. The system of claim 19, wherein the instructions that cause the at least one processor to identify the server based on performance capabilities comprise instructions that, when executed, cause the at least one processor to identify the server based on response times, available storage, or bandwidth of the servers.

* * * * *